United States Patent
Kitasaka et al.

(10) Patent No.: US 6,913,103 B2
(45) Date of Patent: Jul. 5, 2005

(54) HYDRAULICALLY DRIVEN TRAVELING VEHICLE

(75) Inventors: Yuji Kitasaka, Osaka (JP); Takeshi Hasebe, Osaka (JP); Katsunori Katou, Osaka (JP); Toshiyuki Miwa, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 10/203,176

(22) PCT Filed: Dec. 20, 2000

(86) PCT No.: PCT/JP00/09063
§ 371 (c)(1),
(2), (4) Date: Oct. 22, 2002

(87) PCT Pub. No.: WO01/56864
PCT Pub. Date: Aug. 9, 2001

(65) Prior Publication Data
US 2003/0136591 A1 Jul. 24, 2003

(30) Foreign Application Priority Data
Feb. 3, 2000 (JP) .......................... 2000-026377
Feb. 3, 2000 (JP) .......................... 2000-26378

(51) Int. Cl.$^7$ ............................................. B62D 11/02
(52) U.S. Cl. .................... 180/306; 180/6.7; 180/9.1; 180/307; 180/367
(58) Field of Search ................................. 180/6.2, 6.44, 180/6.7, 9, 9.1, 305, 306, 307, 308, 364, 367, 402, 403

(56) References Cited

U.S. PATENT DOCUMENTS 5,682,958 A * 11/1997 Kalhorn et al. ............. 180/308
6,027,177 A * 2/2000 Ferguson et al. ............... 303/3
6,062,332 A * 5/2000 Stephenson et al. ......... 180/305
6,152,248 A * 11/2000 Hidaka et al. ............. 180/6.38
6,260,641 B1 * 7/2001 Hidaka ...................... 180/6.44
6,325,166 B1 * 12/2001 Shimada et al. ........... 180/6.48
6,435,289 B1 * 8/2002 Hori et al. ................... 180/6.3
6,454,033 B1 * 9/2002 Nathan et al. ............. 180/65.1

FOREIGN PATENT DOCUMENTS

| JP | 6-316225 | 11/1994 |
|----|----------|---------|
| JP | 10-146126 | 6/1998 |
| JP | 10-250615 | 9/1998 |
| JP | 11-49026 | 2/1999 |
| JP | 11-291931 | 10/1999 |

* cited by examiner

Primary Examiner—Christopher P. Ellis
Assistant Examiner—Brian Swenson
(74) Attorney, Agent, or Firm—Knobbe, Martens, Olson & Bear LLP

(57) ABSTRACT

A hydraulically driven traveling vehicle comprising a pair of right and left driving axles (driving sprockets) differentially connected to each other by a differential mechanism, the input section of the differential mechanism having the output rotation of traveling HST 110 (110) transmitted thereto, both driving sprockets having mutually opposite two-flow output rotations separately transmitted thereto from a steering HST (120), thereby effecting traveling driving and turning, electromagnetic solenoids (61a, 61b, 62a, 62b) serving as output regulating devices for the traveling HST and the steering HST being provided so that the manipulated variables and directions of a speed change lever and a steering operation tool are converted into electric signals, on the basis of which electric signals the output current values of the electromagnetic solenoids are controlled, causing the respective output rotary speeds of the HSTs to correspond to the output current values.

19 Claims, 16 Drawing Sheets

HYDRAULICALLY DRIVEN TRAVELING VEHICLE

This application is the U.S. National Phase under 35 U.S.C. §371 of International Application PCT/JP00/09063, filed Dec. 20, 2000, which claims priority to Japanese Patent Application No. 2000-26377, filed Feb. 3, 2000 and Japanese Patent Application No. 2000-26378, filed Feb. 3, 2000. The International Application was published under PCT Article 21(2) in a language other than English.

TECHNICAL FIELD

The invention relates to a hydraulically driven traveling vehicle e.g., a crawler vehicle provided with a pair of right and left crawler traveling devices, having respective driving axles differentially connected to each other through a differential mechanism, wherein power is inputted into a traveling hydrostatic stepless transmission (hereinafter, "a traveling HST") so as to drive the right and left crawler traveling devices for traveling of the vehicle, and wherein power of a steering hydrostatic stepless transmission (hereinafter, "a steering HST") is inputted to the differential mechanism so as to make a difference of rotary speed between the left and right driving axles (left and right driving sprocket shafts, if the vehicle is a crawler vehicle) for turning of the vehicle.

BACKGROUND ART

International Publication WO98/12098, for example, discloses a well-known vehicle provided with a pair of right and left crawler traveling devices having respective drive axles differentially connected to each other through a differential mechanism, wherein power is inputted to a traveling HST so as to drive right and left crawler traveling devices for traveling of the vehicle, and wherein power of the steering HST is inputted to the differential mechanism so as to make a difference of rotary speed between the right and left crawler traveling devices for turning of the vehicle.

In the vehicle, the traveling HST and the steering HST are provided with respective hydraulic servomechanisms for controlling positions of respective movable swash plates. Each of the servomechanisms includes an electronically automatic control valve and a manipulated control valve. The manipulated control valve of the traveling HST is interlockingly connected through a mechanical linkage to a lever (or pedal, etc.) for speed change, and that of the steering HST to a steering handle (a steering operation tool in this document, however, it may be a lever, etc.). Such manipulation devices are manipulated so as to control the manipulated control valves, thereby controlling the positions of the movable swash plates, respectively. It can be read in the document that the automatic control valves are provided for adjusting the positions of the respective movable swash plates controlled by manipulation.

Many of such constructed vehicles use the traveling HST as a main speed change mechanism and have a multi-stage sub speed change mechanism including a plurality of speed changing gears or hydraulic clutches, which serves as a transmission system interposed between the traveling HST and the differential mechanism. In this case, the above-mentioned speed change lever for controlling output of the traveling HST serves as a main speed change lever. Additionally, a sub speed change operation device (like a lever or a switch) is provided separately from the main speed change lever so as to select a speed stage of the sub speed change mechanism. The vehicle disclosed in the cited document also has such a structure.

If output of the traveling HST and output of the steering HST are controlled individually, i.e., if the movable swash plate of the traveling HST is controlled independently of manipulation of the steering handle, or if the movable swash plate of the steering HST is controlled independently of manipulation of the speed change lever, the vehicle turns at the speed set by the speed change lever regardless of the manipulated degree of the steering handle. Therefore, the vehicle does not decelerate even if the steering handle of the vehicle traveling fast is turned to the limit. Such a turning is unstable and may be dangerous.

It is assumed that output of the steering HST is decided uniformly according to the steering angle of the handle regardless of the setting of the speed change lever. Even if the steering angle of the handle is constant, a ratio of output of the traveling HST to that of the steering HST becomes large in high-speed traveling, thereby making a turning radius large. On the contrary, in low-speed traveling, the ratio becomes small, thereby making the turning radius small. In this way, sense in steering operation and accuracy in turning of the vehicle become wrong.

The output of the steering HST is used for acceleration of a turning-outside crawler traveling device and deceleration of a turning-inside crawler traveling device, thereby turning the vehicle. The larger the steering angle becomes, the smaller the driving speed of the turning-inside crawler traveling device becomes, and it reaches zero. If the steering angle is further increased, the rotation of the turning-inside crawler traveling device is reversed. Such a turning while the turning-inside crawler traveling device is stationary or rotated reversely is called a brake turn. If the output of the steering HST is independent of the output of the traveling HST as mentioned above, the steering angle at the time of start of the brake turn, i.e., when the turning-inside crawler traveling device stops, varies according to variation of output of the traveling HST. Thus, a driver must manipulate the steering handle to adjust the angle thereof troublesomely when the brake turn is going to be done.

Then, in the vehicle disclosed in the cited document, the linkage between the speed change lever and the manipulated control valve for controlling the position of the movable swash plate of the traveling HST is mechanically interlocked with the linkage between the steering handle and the manipulated control valve for controlling the position of the movable swash plate of the steering HST, so that the traveling speed varies correspondingly to the steering angle of the handle. Basically, the larger the steering angle becomes, the smaller the output of the traveling HST is made so as to decrease the real vehicle-center speed. Furthermore, the larger the stroke of the speed change lever becomes (toward the maximum speed limit), the larger the deceleration degree becomes, so that, when the steering angle is adjacent to its maximum, the real vehicle-center speed is almost constant regardless of the setting position of the speed change lever.

However, in this interlocking structure, while the output of the traveling HST varies correspondingly to the position of the speed change lever and the steering angle of the handle, the output of the steering HST varies correspondingly to only the steering angle. That is, while the steering angle is constant, the output of the steering HST is constant whether the output of the traveling HST increases or decreases, so that the ratio of output between the steering HST and the traveling HST at any steering angle varies according to the position of the speed change lever. Thus, it is impossible to make the turning radius at every arbitrary steering angle exactly constant however the position of the speed change lever, i.e., the traveling speed varies. Further, the above-mentioned object, that is, to make the steering angle at the starting of brake turn constant, is not achieved.

It is unfit for a small crawler vehicle to further improve the cited mechanical linkage for achievement of the above objects, because the improvement further complicates the linkage, expands a space for it, and increases costs.

The cited vehicle travels at approximately constant speed while the steering angle is extremely small. However, if the steering angle exceeds a certain value, the traveling speed reduces proportionally. Thus, for example, the reduction ratio of traveling speed to the increase of steering angle, which is good when the steering angle is large to some degree, is felt too large when the steering angle is small. Namely, when the steering angle is not so large and even if it is changed a little, a great reduction of traveling speed is felt and a turning circle of the vehicle becomes too small.

In this way, mechanical connection of output of the traveling HST with output of the steering HST is necessarily inaccurate in control, or it must be further complicated for enhancing the accuracy. Such a complicated structure is not acceptable with respect to an arrangement space and costs.

Furthermore, for stopping such a vehicle having the HSTs, instead of disengagement of a clutch, the speed change lever is set to the neutral position so as to stop output of the traveling HST, the steering handle is returned to the straight traveling position so as to stop output of the steering HST, and then, a brake is actuated so as to stop the left and right axles surely. However, when the brake must be hit, neither the traveling HST nor the steering HST is put into neutral, thereby advancing wearing of the drive axles. Moreover, if the neutralization of the traveling HST and the steering HST after braking is forgotten, the outputs of both the HSTs rebound suddenly when the brake is released. However, it is troublesome to put both the speed change lever and the steering handle into the respective neutral positions every braking operation.

On the other hand, it is hard for a driver to comprehend the relationship between the position of the speed change lever and the traveling speed because the speed change lever changes the traveling speed steplessly. Therefore, it is difficult to re-create the traveling speed after the speed change lever is returned to the neutral position for stopping the vehicle.

SUMMARY OF THE INVENTION

A first object of the present invention is to provide a vehicle comprising a pair of left and right drive axles (e.g., left and right driving-sprocket shafts of respective crawler traveling devices) differentially connected to each other through a differential unit, a traveling HST whose output rotation is transmitted to an input section of the differential unit for traveling of the vehicle, a steering HST whose mutually opposite two-flow output rotations are transmitted to the respective drive axles for turning of the vehicle, and tools manipulated by a driver including a speed change operation tool for setting a traveling speed in each of forward and backward travelings and a steering operation tool (e.g., a steering wheel) for setting a turning radius in each of left and right turnings, wherein the vehicle does not require a complicated mechanical linkage but has a compact, simple and economical structure which can control such outputs of the traveling HST and the steering HST as to ensure a good feeling in turning correspondingly to manipulation of the speed change operation tool and the steering operation tool.

To attain the first object, according to the present invention, electromagnetic solenoids serve as respective output regulating means of the traveling HST and the steering HST. The degrees and directions of the speed change operation tool and the steering operation tool are converted into electric signals, and electric output currents of the electromagnetic solenoids are controlled based on the electric signals so as to realize respective output rotational speeds of the HSTs corresponding to the output currents. Each of output currents of the electromagnetic solenoids of the traveling HST and the steering HST is controlled based on both the electric signal caused by manipulating the speed change operation tool and the electric signal caused by manipulating the steering operation tool.

Output of each HST is not controlled by interposing a mechanical linkage from the speed change operation tool and the steering operation tool to the traveling and steering HSTs, but is controlled by controlling the output current value of the electromagnetic solenoid according to electric data with respect to positions of the speed change operation tool and the steering operation tool, whereby it is achieved by a simple, compact and economic structure.

For such a simple and compact structure, a hydraulic servomechanism may serve as each of the output regulating means of the traveling HST and the steering HST. An electromagnetic proportional valve serving as means for hydraulically controlling the servomechanism may be provided with the above-mentioned electromagnetic solenoid.

For improving the feeling in turning, the output current value of the electromagnetic solenoid of the traveling HST is controlled in the above-mentioned way while the steering operation tool is operated from the straight traveling setting position to a limit setting position for either left or right turning so that the output speed of the traveling HST during straight traveling of the vehicle is little changed while the steering operation tool is within a certain range from the straight traveling position, and that it is reduced in a geometric progression when the steering operation tool is over the certain range. In this way, while the steering angle is small, the traveling speed is little reduced so that the vehicle can turn a little at almost the same speed with that in straight traveling. If the steering angle becomes large, the traveling speed is reduced in geometric progression so that the vehicle can do a small turn or a brake turn safely and comfortably.

While a speed of the drive axle on inside in turning is reduced during manipulation of the steering operation tool from the straight traveling position to reduce the turning radius according to the above-mentioned control of output currents of the respective electromagnetic solenoids of the traveling HST and the steering HST, a setting position of the steering operation tool when the speed becomes zero is fixed so that the steering angle on starting of the brake turn is fixed, thereby enabling a driver to do steering operation based on exact notice of the steering angle for starting the brake turn. Thus, a driver is prevented from being shocked by unexpectedly early brake turn during the steering operation.

The output current of the electromagnetic solenoid of the traveling HST is so controlled that a ratio of output speed of the traveling HST when the steering operation tool is set at any arbitrary position to the output speed thereof when the vehicle travels straight is fixed wherever the speed change operation tool is set. Accordingly, whichever setting position the speed change operation tool is put into, a speed of the vehicle-center when the steering operation tool is set at any position can be read from the setting position of the speed change operation tool.

In addition, the output current value of the electromagnetic solenoid of the steering HST is so controlled that an output speed ratio of the steering HST to the traveling HST every when the steering operation tool is set at an arbitrary position is fixed wherever the speed change operation tool is set. Accordingly, however speed is set by the speed change operation tool, a turning radius of the vehicle can be fixed when the steering operation tool is set at any position, i.e., at any steering angle. That is, whether the vehicle travels fast or slowly, a driver can comprehend how much degree the steering operation tool is operated to correspond to a requested turning radius of the vehicle, thereby facilitating the vehicle to turn properly and improving a sense of turning.

Moreover, since both the ratio of output speed of the traveling HST every when the steering operation tool is set at an arbitrary setting position to the output speed thereof when the vehicle travels straight and the ratio of output speed of the steering HST to output speed of the traveling HST every when the steering operation tool is set at an arbitrary setting position are fixed wherever the speed change operation tool is set, such an effect can be also obtained that the above-mentioned steering angle for vanishing the speed of the drive axle on inside in turning when the brake turn begins is fixed.

However, while the output speed of the steering HST is controlled in the above-mentioned manner, the steering operation tool must be manipulated to a constant degree for obtaining the same turning radius whether the vehicle travels fast or slowly, thereby giving such an impression that it is hard to turn the steering wheel when the vehicle travels slowly. Then, according to the present invention, while the setting position of the speed change operation tool is within a range for lower speed than a certain value, the output speed ratio of the steering HST to the traveling HST every when the steering operation tool is set at an arbitrary setting position is larger than the above-mentioned fixed value. Therefore, a turning radius corresponding to any fixed steering angle when the vehicle travels slowly is smaller than that when the vehicle travels fast, thereby improving a response of turning of the vehicle to the steering operation so as to ease the steering operation when the vehicle travels at low speed. Incidentally, when the speed change operation tool is set in another range for higher speed than the certain value, the traveling HST and the steering HST are controlled in their output speeds so that the turning radius at every arbitrary steering angle and the steering angle at start of the brake turn are fixed regardless of variation of traveling speed.

A second object of the present invention is to provide a vehicle which controls the respective output speeds of the traveling HST and the steering HST with controlling of the electromagnetic solenoids based on positional detection of the speed change operation tool and the steering operation tool, wherein, even if the speed change operation tool is manipulated quickly, a sudden change of the output speed is avoided so as to ensure safety and comfort.

To attain the second object, according to the present invention, an upper limit is provided to displacement speed of output current value of the electromagnetic solenoid for controlling output speed of the traveling HST. If the displacement speed of the output current value exceeds the upper limit, the output current value is displaced at the upper limit speed.

A third object of the present invention is to provide a control system for automatically neutralizing the traveling HST and the steering HST only according to braking operation without operation of the speed change operation tool and the steering operation tool, thereby saving a driver's labor for manipulation. It is also to provide a vehicle simply and compactly equipped with such a control system.

To attain the third object, according to the present invention, a brake for braking both the drive axles is disposed in a transmission system to both the drive axles. Also, a brake operation tool such as a foot pedal is provided for operating the brake. If a stroke of the brake operation tool reaches a predetermined neutral position, the output current values of the electromagnetic solenoids are controlled so as to vanish the output speeds of the traveling HST and the steering HST. Therefore, during braking operation, wearing of the drive axles is reduced. Also, manipulation labors can be reduced because both the HSTs is automatically neutralized for avoiding a sudden start of the vehicle on releasing the brake. Furthermore, during the brake actuation, the speed change operation tool and the steering operation tool are maintained at their state before braking so as to re-create the traveling speed and the turning angle of the vehicle before braking only by releasing the braking.

For a detailed configuration of a control system for automatically neutralizing the traveling and steering HSTs according to the braking operation, a switch is provided so as to change when the brake operation tool is operated at a stroke to the above-mentioned neutral setting position. The change of the switch is detected with an electric signal so that the output currents of the electromagnetic solenoids are controlled so as to vanish the output speeds of the traveling HST and the steering HST. By such a simple and compact configuration, the above-mentioned neutralization of both the HSTs when braking can be obtained.

In this configuration, the displacement speeds of output currents of the electromagnetic solenoids for restoring the output speed of the traveling HST and the steering HST when the stroke of the brake operation tool is reduced across the neutral setting position are restricted under fixed values so as to prevent the traveling speed and turning angle of the vehicle from being restored suddenly according to brake-releasing, thereby ensuring safety.

The neutral setting position is set on a stroke position of the brake operation tool corresponding to a stroke smaller than that to a brake setting position for braking actuation so as to make such a double function that the braking operation is performed after neutralizing operation of both the HSTs. Thus, since outputs of both the HSTs are reduced to some degree or vanished when the brake acts, wearing of the drive axles and the brake can be reduced and a reasonable braking process from deceleration to braking can be obtained.

In this braking configuration, by restricting the displacement speed of output currents of the electromagnetic solenoids for vanishing the output speeds of the traveling HST and the steering HST when the brake operation tool reaches the neutral setting position, it occurs certainly that the vehicle is gradually decelerated and then braked.

A fourth object of the present invention is to provide a vehicle whose traveling HST and steering HST are electrically controlled in their outputs in the above way, wherein the vehicle is safe from unexpected sudden start when the engine starts.

To attain the fourth object, according to the present invention, engine starting becomes possible when the brake operation tool is operated at the stroke to the braking setting position and the neutral location of the speed change operation tool is recognized. Accordingly, when the brake acts but the traveling HST is not neutral, the engine does not start, thereby avoiding unexpected sudden start of the vehicle when the engine starts.

These, other and further objects, features and advantages will appear more fully in the following description on the basis of accompanying drawings.

BRIEF DESCRIPTION OF DRAWINGS/FIGURES

BEST MODE FOR CARRYING OUT THE INVENTION

First of all, description will be given of a general structure of a crawler tractor serving as an embodiment of a crawler traveling vehicle according to the present invention.

Figure 1:
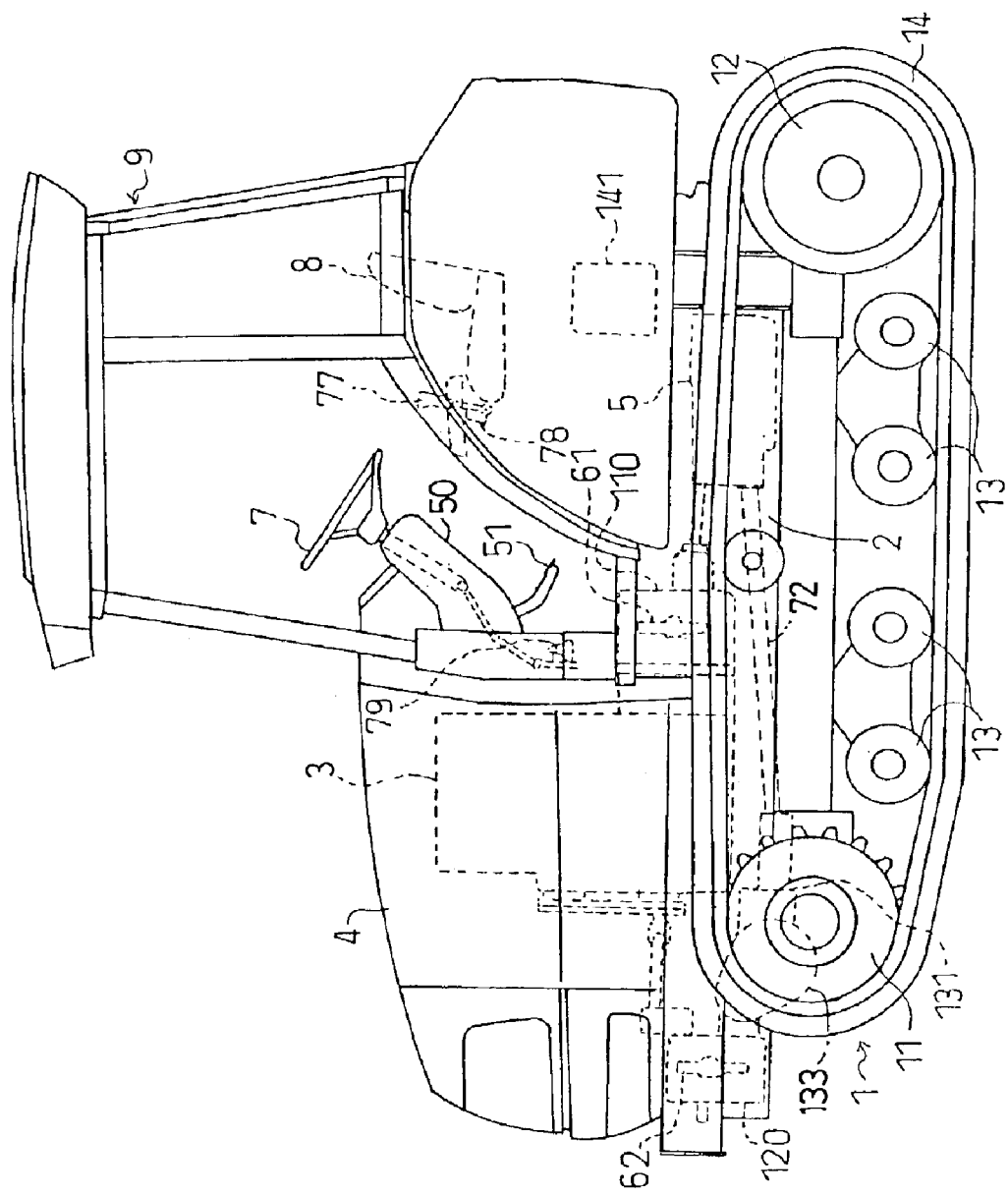
FIG. 1 is an entire side view of a crawler tractor serving as an embodiment of a vehicle according to the present invention.

As shown in FIG. 1, a pair of crawler traveling devices 1 are disposed at left and right of the tractor body. An engine 3 is disposed at a front portion of the tractor body and covered with a hood 4.

A cabin 9 is erected behind hood 4. A dashboard 50 is erected at a front portion in cabin 9, and provided thereon with a steering wheel 7 and a brake pedal 51. A main speed change lever 77 for switching the traveling direction of the tractor between forward and backward and for steplessly changing the traveling speed of the tractor, a sub speed change switch 76 shown in FIG. 4, and so on are disposed adjacently to a driver's seat 8 in cabin 9.

Each of right and left crawler traveling devices 1 comprises a crawler frame 2 supported below each of the right and left portions of the vehicle body, a driving sprocket 11 supported on a front end portion of crawler frame 2, an idler 12 supported on a rear end portion of crawler frame 2, a plurality of rollers 13 supported on crawler frame 2 between driving sprocket 11 and idler 12, and a crawler belt 14 looped over driving sprocket 11, idler 12, and the plurality of rollers 13.

Figure 2:
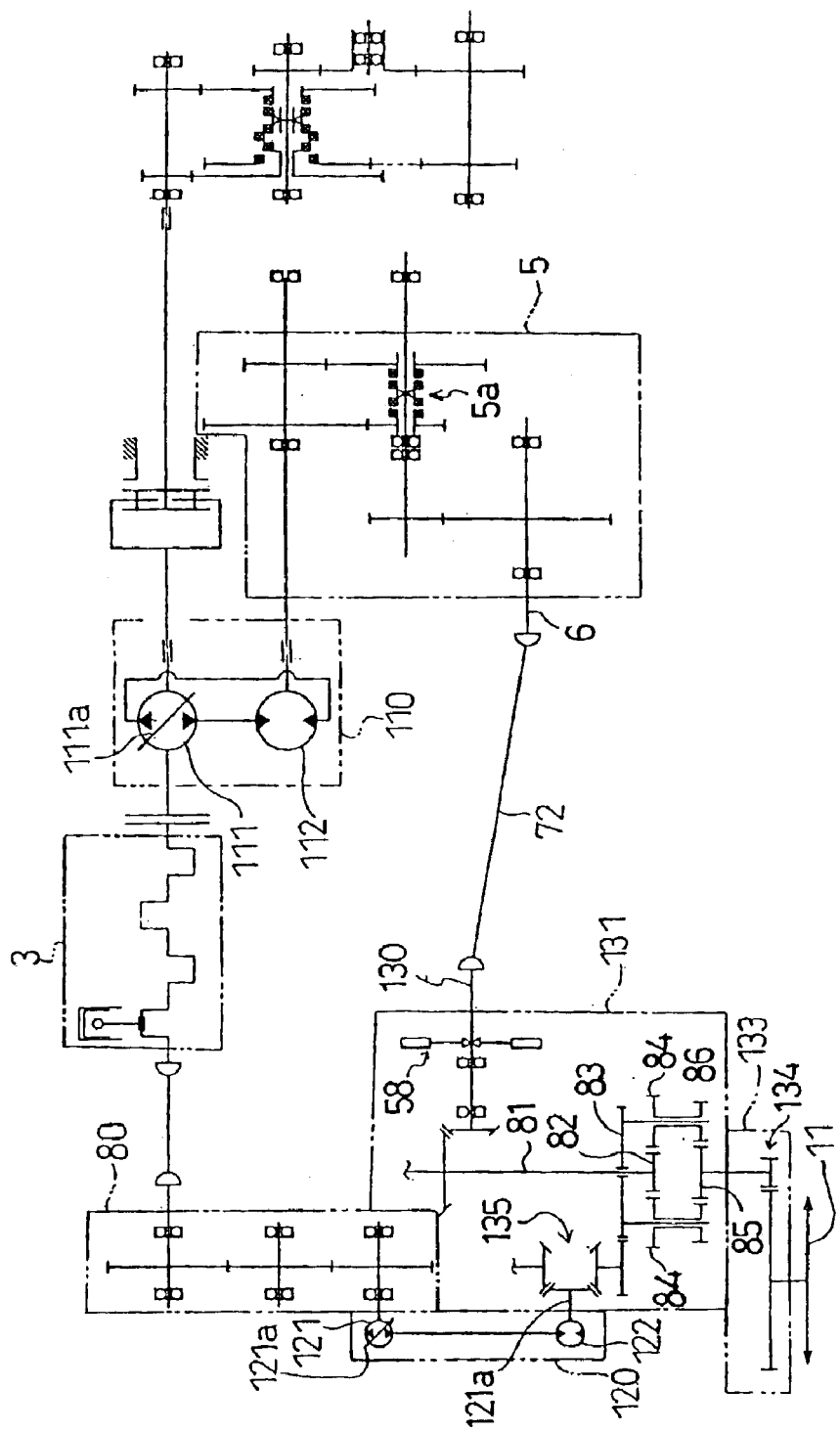
FIG. 2 is a diagram of a traveling and steering drive system of the crawler tractor from an engine to left and right driving sprockets.

As shown in FIGS. 1 and 2, a traveling HST 110 serving as a main speed-changing device is disposed behind engine 3. Behind traveling HST 110 is disposed a transmission casing 5 containing a two-stage (in this embodiment) sub speed-changing gear mechanism. The total number of stages provided by a sub speed change system according to this embodiment is three. In this regard, by manipulating a sub speed change lever (not shown) in cabin 8, a sub speed change clutch 5a is changed so as to put the sub speed-changing gear mechanism into either a low-speed gear stage or a high-speed gear stage. Furthermore, while the sub speed change lever is set at the low-speed gear stage position, sub speed change switch 76 can be switched between a first low-speed stage and a second low-speed stage. Sub speed change switch 76 changes the tilt setting of a movable swash plate 111a of a hydraulic pump 111 in traveling HST 110.

A differential unit housing 131 is disposed on the front portion of the vehicle body so as to contain a differential unit 132. A pair of final speed-reduction gear boxes 133 are disposed on respective right and left sides of housing 131 so as to contain respective final speed-reduction gears 134. Each of driving sprockets 11 is disposed on the outside of each gear box 133.

According to this embodiment, a pair of right and left planetary gear mechanisms constitute differential unit 132.

In this regard, on each of right and left ends of a lateral sun gear shaft 81 are fixedly provided an input sun gear 32, and freely rotatably provided a carrier 83. On the other hand, a driving axle 86 interlocking with final speed-reduction gear 134 in each gear box 133 is disposed coaxially to sun gear shaft 81. In each gear box 133, an output sun gear 85 is fixed on an end of driving axle 86. Planet gears 84 are pivoted on each carrier 83 so as to mesh with both input sun gear 82 and output sun gear 85.

FIG. 2 illustrates only the planetary gear mechanism, gear box 133, final speed-reduction gear 134 and driving sprocket 11 on the left side of differential unit 132, and omits those on the right side of differential unit 132.

In housing 131 is disposed a traveling-driving input shaft 130, which interlocks with sun gear shaft 81 through bevel gears and projects rearward from housing 131. A transmission shaft 72 is interposed through universal joints between a transmission output shaft 6 projecting forward from casing 5 and shaft 130. In this way, power of engine 3 transmitted through traveling HST 110 serving as the main speed-changing device and the sub speed-changing gear mechanism in transmission casing 5 is inputted into input sun gear 82 through transmission shaft 72.

On the other hand, a gear casing 80 and a steering HST 120 are disposed in front of engine 3 so that power of engine 3 is inputted into a gear mechanism in gear casing 80 and a hydraulic pump 121 of steering HST 120. In steering HST 120, a hydraulic motor 122 is fluidly connected to hydraulic pump 121. A steering output shaft 122a of hydraulic motor 122 projects into housing 131, and a bevel gear mechanism 135 divides the rotation of steering output shaft 122a into mutually opposite two-flow rotations. The two-flow rotations are inputted into respective carriers 83 in right and left planetary gear mechanisms of differential unit 132 through gears. That is, each of right and left carriers 83 serves as a section for inputting the output of steering HST 120.

In this way, in each of the right and left planetary gear mechanisms of differential unit 132, the force of input sun gear 82 created by the output of traveling HST 110 and the force of carrier 83 created by the output of steering HST 120 result in that planet gears 84 revolve around sun gear 81 and rotate about their own axes. The revolution and rotation of planet gears 84 is transmitted to output sun gear 85 so as to rotate driving axle 86, thereby being finally transmitted to each driving sprocket 11.

By the output force of steering HST 120, mutually opposite rotary forces are applied onto respective right and left carries 83 so that the driving force of one carrier 83 is added to the rotary of corresponding input sun gear 82 and that of the other carrier 83 is subtracted from the rotary of corresponding input sun gear 82. Consequently, one of right and left driving axles 86 is accelerated, and the other decelerated, thereby turning the vehicle.

Figure 3:
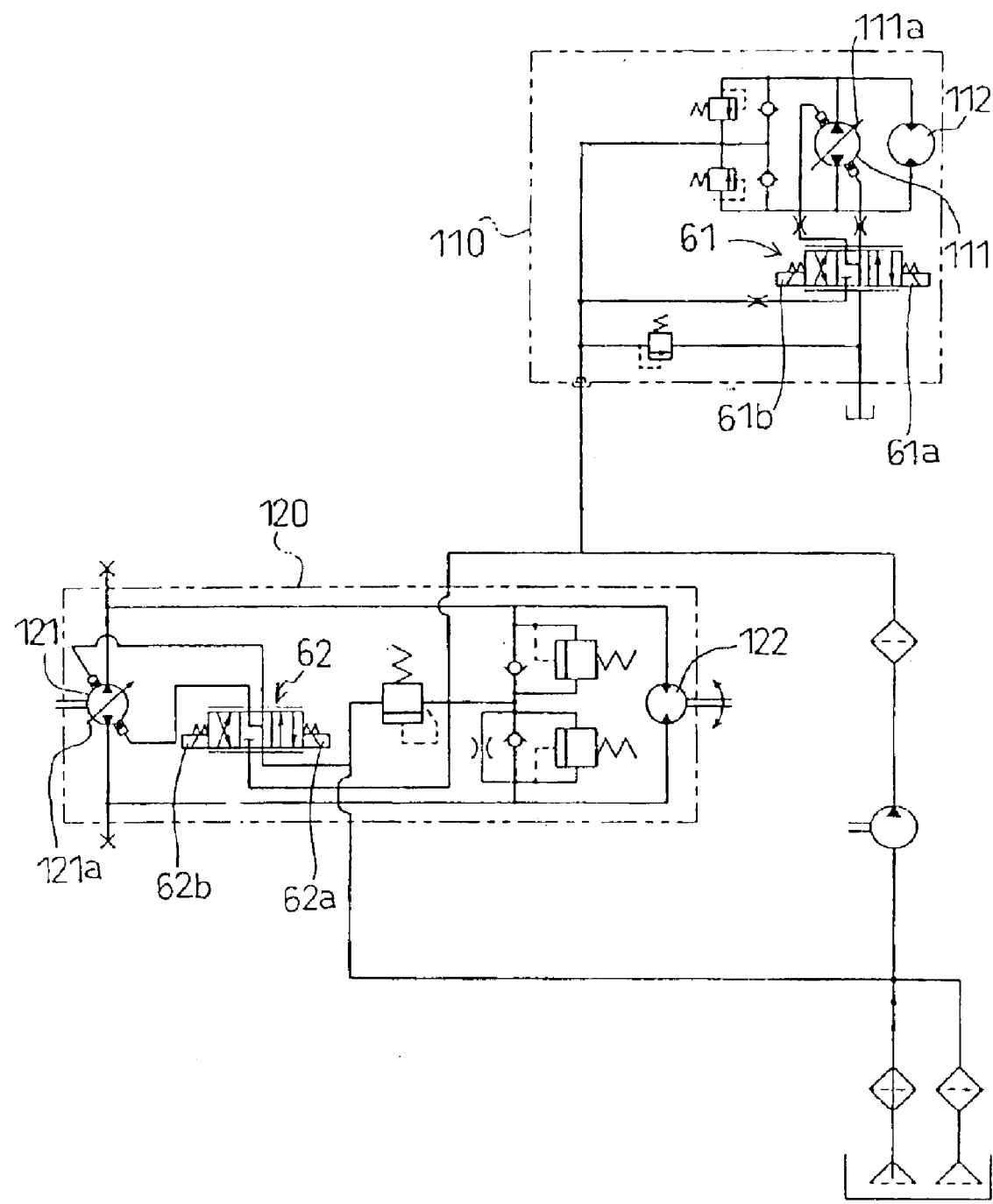
FIG. 3 is a diagram of a hydraulic circuit of the traveling HST and the steering HST in the crawler tractor using electromagnetic proportional valves.

Description will now be given of a structure and a control system of traveling HST 110 and steering HST 120 in accordance with FIGS. 2 to 4.

Traveling HST 110 is constituted by a variable displacement type traveling hydraulic pump 111 and a traveling hydraulic motor 112 fluidly connected to each other. Traveling hydraulic pump 111 is driven by power of engine 3 so as to send pressure oil to traveling hydraulic motor 112 while the flow direction and volume of the pressure oil correspond to the controlled position of a movable swash plate 111a of traveling hydraulic pump 111, thereby controlling the direction and speed of output rotation of traveling hydraulic motor 112.

Steering HST 120 is constituted by variable displacement type steering hydraulic pump 121 and steering hydraulic motor 122 fluidly connected to each other. Steering hydraulic pump 121 is driven by power of engine 3 so as to send pressure oil to steering hydraulic motor 122 while the flow direction and volume of the pressure oil correspond to the controlled position of a movable swash plate 121a of steering hydraulic pump 121, thereby controlling the direction and speed of output rotation of steering hydraulic motor 122.

According to this embodiment, hydraulic servomechanisms are provided for positional controlling of respective movable swash plates 111a and 121a. A traveling electromagnetic proportional valve 61 and a steering electromagnetic proportional valve 62 are controlled in location correspondingly to respective output currents of electromagnetic solenoids so as to control the respective hydraulic servomechanisms hydraulically.

Figure 4:
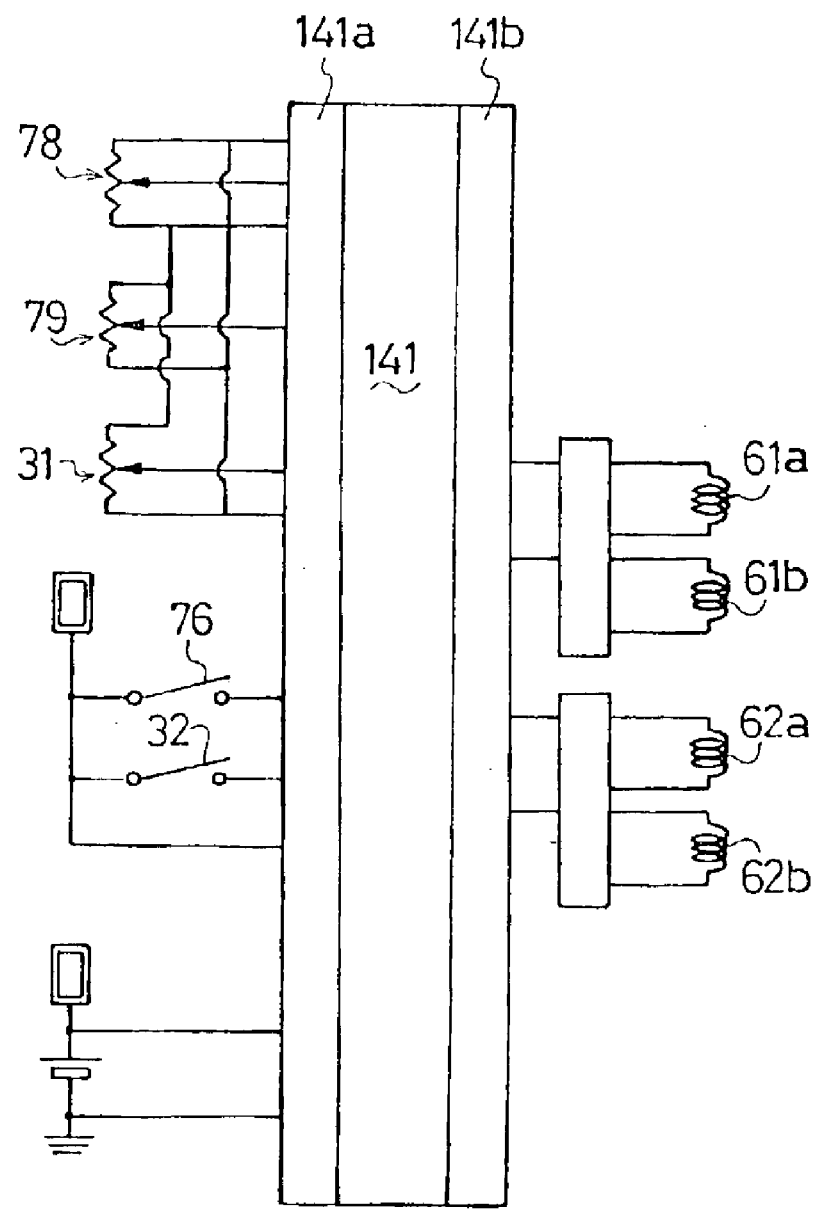
FIG. 4 is a diagram of an electric control system for the electromagnetic proportional valves.

As shown in FIG. 4, valve 61 for controlling the position of swash plate 111a is provided with two solenoids 61a and 61b, which are provided for forward traveling and backward traveling of the vehicle respectively. Solenoids 61a and 61b are connected to an output interface (D/A converter) 141b of an HST controller 141 for controlling valve 61 and a later-discussed electromagnetic proportional valve 62. An angle sensor 78 for detecting the position of main speed change lever 77 is connected to an input interface (A/D converter) 141a of controller 141.

When main speed change lever 77 is manipulated, the manipulated direction and angle thereof from its neutral position are detected with angle sensor 78. On the basis of this detection, controller 141 controls so that current value corresponding to the detected manipulated angle thereof flows to one of two solenoids 61a and 61b, thereby locate movable swash plate 111a at a position corresponding to the manipulated position of lever 77.

Additionally, sub speed change switch 76 is connected to input interface (A/D converter) 141a of HST controller 141 so that switch 76 can be switched between the two positions, i.e., the first low-speed position and the second low-speed position while the sub speed change lever is set in the low-speed gear stage. Controller 141 predetermines the respective most tilt angles of swash plate 111a for forward traveling and backward traveling corresponding to each stage of switch 76 and a ratio of tilt angle of swash plate 111a to the shifted angle of main speed change lever 77 (i.e., the displacement value of angle sensor 78) within the range bounded by the above-mentioned most tilt angles. If switch 76 is set in the first low-speed stage, each of the most tilt angles of swash plate 111a (i.e., the most current of each of solenoids 61a and 61b), which corresponds to a full stroke position of lever 77 (i.e., each of the maximum forward-traveling speed position and the maximum backward-traveling speed position thereof) is small, and if switch 76 is set in the second low-speed stage, each of the most tilt angles of swash plate 111a is large. In each of the two cases, the tilt range of swash plate 111a is shared by tilt angles of swash plate 111a (i.e., currents of solenoids 61a and 61b) in relation to the shifted angle of lever 77.

Accordingly, when the first low-speed stage is set, the ratio of tilt of swash plate 111a to the shift of lever 77 is small so as to facilitate the fine adjustment of traveling speed. When the second low-speed stage is set, the ratio of tilt of swash plate 111a becomes larger. If a considerably great acceleration is requested, the second low-speed stage may be set so as to obtain a considerably great variation of speed in relation to the shift of lever 77.

Steering electromagnetic proportional valve 62 for controlling the position of movable swash plate 121a is provided with two solenoids 62a and 62b, which are provided for right turning and left turning of the vehicle respectively. Solenoids 62a and 62b are connected to output interface (D/A converter) 141b of controller 141. An angle sensor 79 for detecting the manipulated angle of steering wheel 7 is connected to input interface (A/D converter) 141a of controller 141.

When steering wheel 7 is rotated, the rotated direction and angle thereof from its neutral position (a straight traveling setting position) are detected with angle sensor 79. On the basis of this detection, controller 141 controls so that current value corresponding to the detected rotated angle thereof flows to one of two solenoids 62a and 62b, thereby locate swash plate 121a at a position corresponding to the rotated direction and angle of steering wheel 7.

Furthermore, since it is set that the traveling speed varies correspondingly to the steering angle as discussed later (referring to a later-discussed real vehicle-center speed Vc), movable swash plate 111a, i.e., solenoids 61a and 61b are also controlled on the basis of detection by angle sensor 79. On the other hand, since the output of steering HST 120 varies correspondingly to the setting speed of main speed change lever 77 (referring to a later-discussed steering output speed Vs), movable swash plate 121a, i.e., solenoids 62a and 62b are also controlled on the basis of detection by angle sensor 78.

Moreover, brake pedal sensor 31 for detecting the depression of brake pedal 51 and a brake pedal switch 32, which is turned on when brake pedal 51 is depressed for braking, are connected to the D/A converter of controller 141 so that the output rotary speeds of both hydraulic motors 112 and 122 are changed according to the depression degree of brake pedal 51.

Description will now be given of a speed control when the vehicle turns. Hereinafter, "speed" is referred to as a value decided by the setting position of main speed change lever 77 on the assumption that the engine rotary speed (or a throttle of the engine) is kept constant.

Figure 5:
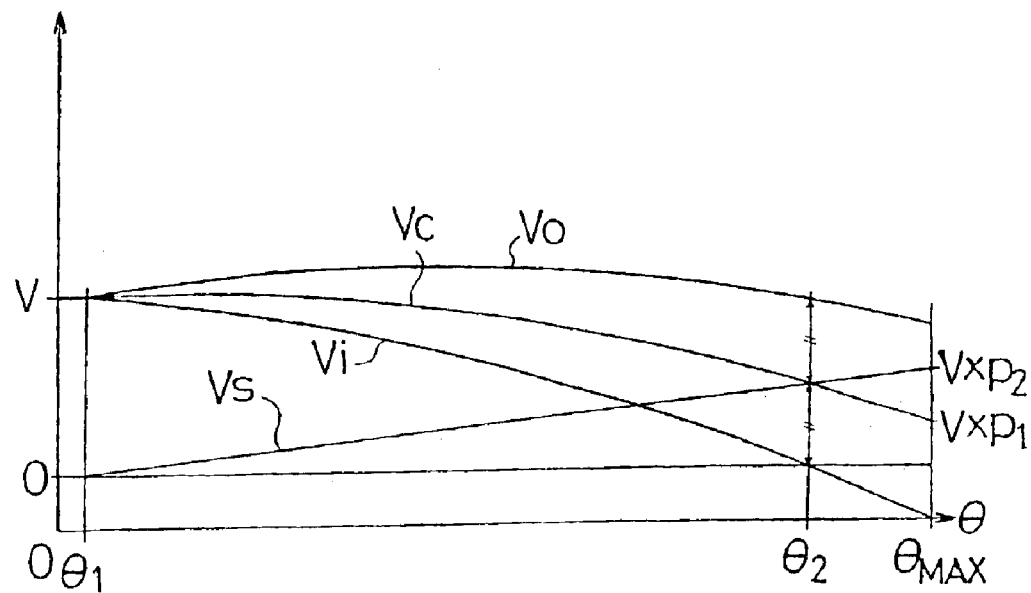
FIG. 5 illustrates respective graphs of a real vehicle-center speed Vc, a real turning-inside speed Vi, a real turning-outside speed Vo and a steering output speed Vs, in relation to a steering angle θ when the speed of the vehicle traveling straight is V.

In FIG. 5, graphs in relation to a steering angle θ, which is a rotational angle θ of steering wheel 7 rotated either clockwise or counterclockwise from the straight traveling setting position, are a real vehicle-center speed Vc, which is a real speed of the lateral middle portion of the vehicle, a real outside-turning speed Vo, which is a real speed of crawler traveling device 1 on outside of the vehicle in turning, a real inside-turning speed Vi, which is a real speed of crawler traveling device 1 on inside of the vehicle in turning, and a steering output speed Vs, which is an added speed of crawler traveling device 1 on outside of the vehicle in turning by driving of steering HST 120. The sub speed stage may be any of the high-speed stage, the first low-speed stage, and the second low-speed stage.

A range of steering angle θ which is equal to or less than $θ_1$ ($0<θ≦θ_1$) is provided for a play of steering wheel 7. While steering wheel 7 is rotated in this range, steering HST 120 is not driven (that is, steering output speed Vs is maintained to zero) so that speeds Vc, Vo and Vi at respective portions of the vehicle are maintained to a straight-traveling speed V.

If steering angle θ exceeds the play-limit angle $θ_1$, steering HST 120 carries out even deceleration and acceleration of steering output speed Vs in the respective turning-inside and turning-outside driving sprockets 11 in substantially proportion to the increase of steering angle θ, thereby creating real turning-inside speed Vi and real turning-outside speed Vo (see Formula I).

$$Vo=Vc+Vs, \quad Vi=Vc-Vs \qquad \text{Formula I}$$

Real vehicle-center speed Vc, which is an average of real turning-outside speed Vo and real turning-inside speed Vi, is substantially created by the output of traveling HST 110 corresponding to any steering angle θ because the deceleration of turning-inside driving sprocket 11 and the acceleration of turning-inside driving sprocket 11, that are caused by steering HST 120, are equal to each other. That is, by the setting of HST controller 141, the output rotary speed of steering HST 120 is essentially controlled so as to decrease according to increase of steering angle $θ(≧θ_1)$ so that real vehicle-center speed Vc also decreases according to increase of steering angle $θ(≧θ_1)$.

Figure 6:
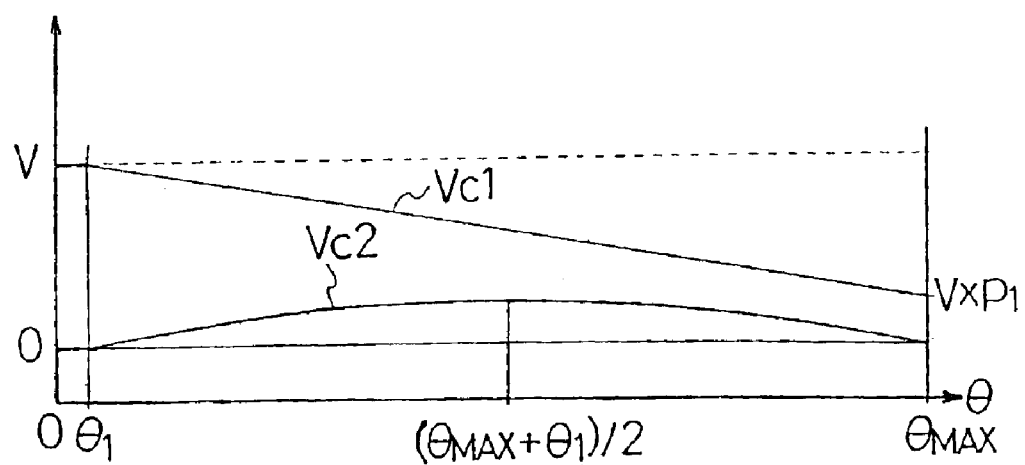
FIG. 6 illustrates respective graphs of a standard vehicle-center speed Vc1 and an additional vehicle-center speed Vc2 for realizing the real vehicle-center speed Vc, in relation to steering angle θ when the speed of the vehicle traveling straight is V.

When it is assumed that the output rotary speed of traveling HST 110 decreases in proportion to steering angle $θ(≧θ_1)$, the vehicle-center speed is expressed with a rectilinear graph slanting upwardly rightward shown in FIG. 6. This will be called a standard vehicle-center speed Vc1.

For example, it is assumed that standard vehicle-center speed Vc1 in relation to steering angle $θ(≧θ_1)$ becomes $p_1$ ($0<p_1<1$) times straight-traveling speed V when steering angle θ reaches the maximum angle $θ_{MAX}$. Standard vehicle-center speed Vc1 is calculated with Formula II.

$$\text{Formula II}: \quad Vc = V - (V - p_1 * V) * (θ - θ_1)/(θ_{MAX} - θ_1)$$
$$= V * \{1 - (1 - p_1) * (θ - θ_1)\}/(θ_{MAX} - θ_1)$$
$$θ_1 ≦ θ ≦ θ_{MAX}$$

According to this variation of standard vehicle-center speed Vc1 in relation to steering angle θ, the speed reduction rate of vehicle-center speed Vc is fixed whether steering angle θ is small or large. However, even if the speed of the vehicle center is reduced appropriately in the state where steering angle θ is large (e.g., the maximum angle $θ_{MAX}$), the vehicle-center speed while steering angle θ being small is desired to be almost the same with that when the vehicle travels straight. Furthermore, it is desirable that the vehicle-center speed is gradually reduced as steering angle θ increased to some degree, and the rate of deceleration thereof becomes large so as to enable the vehicle to do a small turn when steering angle θ becomes close to maximum angle $θ_{MAX}$.

Then, as shown in FIG. 6, an additional vehicle-center speed Vc2 is established as a correction value to be added to standard vehicle-center speed Vc1, and real vehicle-center speed Vc is calculated with Formula III.

$$Vc=Vc1+Vc2 \qquad \text{Formula III}$$

Thus, such a graph of real vehicle-center speed Vc as shown in FIG. 5 is obtained.

It is made into Vc2=0 at the time of $0≦θ≦θ_1$. At the time of $θ≧θ_1$, if straight-traveling vehicle V is made to be one and steering angle $(θ-θ_1)$ serves as a variable, Vc2 may be calculated with a quadratic function $f_1(θ-θ_1)$ so that it becomes the maximum value $Vc2_{MAX}$ at the time $θ=θ_1+(θ_{MAX}+θ_1)/2=(θ_{MAX}-θ_1)/2$, and it becomes zero at the time of $θ=θ_1$ and at the time of $θ=θ_{MAX}$. Furthermore, maximum value $Vc2_{MAX}$ is made to vary in proportion to straight-traveling speed V. Then, Vc2 is calculated with Formula IV.

$$Vc2=V*f_1(θ-θ_1) \quad \text{Formula IV:}$$

For establishing function $f_1(θ-θ_1)$, it is made that Vc2≈V-Vc1 at the time of $θ_1 ≦θ<θ_1+(θ_{MAX}-θ_1)/2=$ $(\theta_{MAX}+\theta_1)/2$, whereby Vc2 increases at a tempo that is substantially equal to the decreasing tempo of Vc1 that decreases in proportion to increase of steering angle θ, thereby almost maintaining Vc at straight-traveling speed V. In course of time, the increasing tempo of Vc2 in relation to steering angle θ is reduced. After steering angle θ becomes larger than $(\theta_{MAX}+\theta_1)/2$, Vc2 is acceleratedly reduced according to increase of steering angle θ. Therefore, Vc is gradually reduced according to increase of steering angle θ, and it is reduced in an increased tempo as steering angle θ becomes close to maximum angle $\theta_{MAX}$. Finally, it is made that Vc=Vc1 when steering angle θ reaches maximum angle $\theta_{MAX}$.

Real vehicle-center speed Vc calculated in this way is constant at every arbitrary steering angle θ in relation to straight-traveling speed V however speed V varies. Thus, in the state where main speed change lever 77 is set to any of various speed-setting positions, the vehicle-center speed when steering wheel 7 is rotated to any degree can be read from the set speed. If steering wheel 7 is rotated to a certain angle $\theta_{FIX}$, for example, real vehicle-center speed Vc can be read to be always V/2, e.g., 5 km/s when straight-traveling speed V is 10 km/s, or 10 km/s when straight-traveling speed V is 20 km/s.

Description will be given of control of output of steering HST 120 in relation to steering angle θ, i.e., control of steering output speed Vs. As shown in FIG. 5, it is kept that Vs=0 at the time of θ<$\theta_1$. In the case of $\theta_1 \leq \theta \leq \theta_{MAX}$, first of all, steering output speed $V_{SMAX}$ at maximum steering angle $\theta_{MAX}$ is calculated. Vs is made to increase rectilinearly to the calculated maximum $V_{SMAX}$ according to increase of steering angle θ.

As shown in FIG. 5, for example, it is assumed that maximum steering output speed $V_{SMAX}$ is $p_2$ times straight-traveling speed V and rectilinearly increases from 0 to $V^*p_2$ while steering angle θ increases from $\theta_1$ to $\theta_{MAX}$. That is, Vs is calculated with Formula VI.

$$Vs = V^* p_2^*(\theta-\theta_1)/(\theta_{MAX}-\theta_1) \quad \theta_1 \leq \theta \leq \theta_{MAX} \qquad \text{Formula VI}$$

Then, it is assumed that steering angle θ becomes $\theta_2$ when real turning-inside speed Vi reaches 0, i.e., at the time of start of the brake turn. If this assumption is made true regardless of straight-traveling speed V, Formula VII is materialized with Formulas II, III and IV and the function of Vc2.

$$V-(V-p_1^*V)^*(\theta_2-\theta_1)/(\theta_{MAX}-\theta_1)+V^*f_1(\theta_2-\theta_1)=V^*p_2^*(\theta_2-\theta_1)/(\theta_{MAX}-\theta_1) \qquad \text{Formula VII:}$$

Accordingly, $p_2$ can be calculated with Formula VII'.

$$p_2=\{1+f_1(\theta_2-\theta_1)\}^*(\theta_{MAX}-\theta_1)/(\theta_2-\theta_1)-1+p_1 \qquad \text{Formula VII'}$$

Value $p_2$ is decided so as to materialize VII'. $V_{SMAX}$ is established on the basis of decided $p_2$ so as to fix steering angle θ on the beginning of brake turn to $\theta_2$.

Besides, as mentioned above, Vc1, Vc2 and Vs vary in proportion to straight-traveling speed V so that real vehicle-center speed Vc, real turning-inside speed Vi and real vehicle-outside speed Vo vary in proportion to straight-traveling speed V when each of allowed steering angles θ(≤$\theta_1$) is set. That is, as mentioned above, the ratio of output speed of traveling HST 110 to straight-traveling speed V, i.e., Vc/V, and the ratio of output speed of steering HST 120 to that of traveling HST 110, i.e., Vs/Vc are constant at every steering angle θ regardless of variation of straight-traveling speed V, thereby fixing the turning radius of the vehicle regardless of straight-traveling speed V.

However, steering output speed Vs decided in this way becomes extremely small when straight-traveling speed V is small, that is, when main speed change lever 77 is set at a low-speed position, thereby worsening the reaction of the vehicle to rotation of steering wheel 7. Then, when lever 77 is set at a low-speed position, maximum steering output speed $V_{SMAX}$ is made larger than $V^*p_2$ so as to enlarge steering output speed Vs at every steering angle θ. Therefore, it is made that $V_{SMAX}=K^*V^*p_2$ while K is a driving coefficient of steering HST 120 established as follows:

First, a stroke of main speed lever 77 from its neutral position within each of its respective ranges for forward traveling and backward traveling while it is set in any of the sub speed stages is referred to as H. The maximum stroke thereof is $H_{MAX}$, which is the same whether the vehicle travels forward or backward. Furthermore, there is predetermined a certain stroke $H_2$, which is the same whether the vehicle travels forward or backward. It is made that K=1 at the time of $H_2 \leq H \leq H_{MAX}$, and it is made that K=$f_2(H)$>1 at the time of $0 \leq H \leq H_2$.

This function $f_2(H)$ may be a quadratic function, for example, such that driving coefficient K becomes maximum $K_{MAX}$ at the time of H=0, and it becomes 1 at the time of H=$H_2$.

Figure 7:
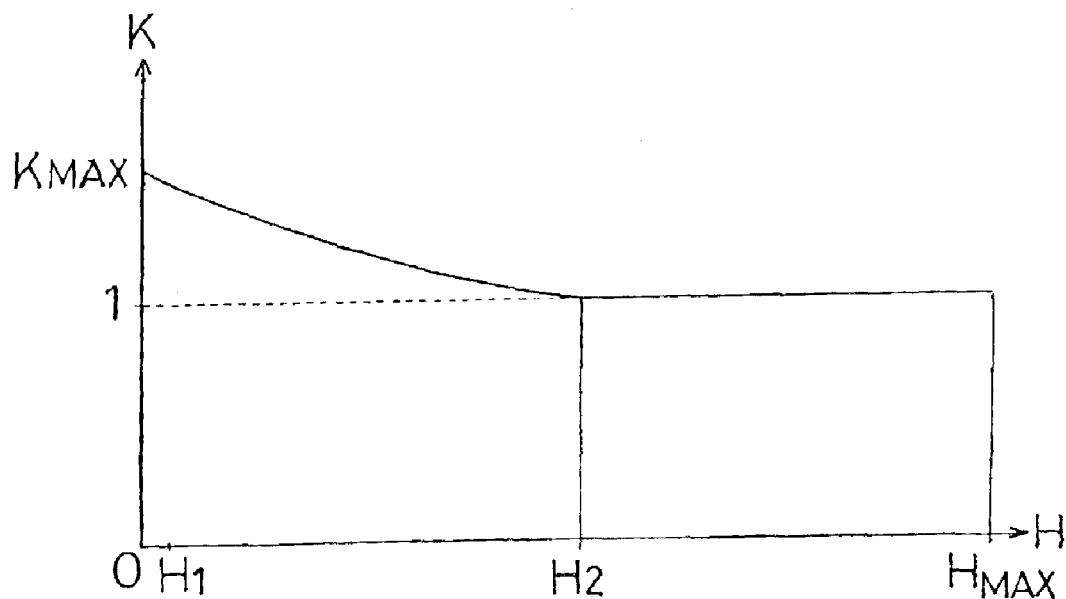
FIG. 7 is a graph of a driving coefficient K for establishing steering output speed Vs in relation to a stroke H of a main speed change lever.

FIG. 7 illustrates a correlation diagram of the driving coefficient of steering HST 120 in relation to stroke H of main speed change lever 77 from its neutral position in the above-mentioned way.

Vs is calculated with driving efficient K through Formula VI'.

$$Vs=K^*V^*p_2^*(\theta-\theta_1)/(\theta_{MAX}-\theta_1) \quad \theta_1 \leq \theta \leq \theta_{MAX} \qquad \text{Formula VI'}$$

Referring to some effects of such calculation of steering output speed Vs, when stroke H of lever 77 is larger than $H_2$ (for setting a higher speed), as mentioned above, the turning radius of the vehicle at any steering angle and the steering angle for starting of the brake turn are fixed regardless of the speed of the vehicle in straight-traveling. When stroke H of main speed change lever 77 is smaller than $H_2$ for setting a lower speed, the smaller stroke H is, the smaller the turning radius of the vehicle becomes and the earlier the brake turn begins (it means that steering angle θ on the beginning of brake turn becomes smaller than $\theta_2$) in comparison with the case where main speed change lever 77 is set for a higher speed. However, paradoxically speaking, this makes the sense in turning of the vehicle at low speed better.

Controller 141 evaluates values Vc1, Vc2 and Vs with Formulas II, III, IV, VI and VII for calculating real vehicle-center speed Vc, real turning-inside speed Vi and real turning-outside speed Vo at every arbitrary steering angle θ on the basis of detection values of angle sensor 78 for detecting the stroke position H of main speed change lever 77 and angle sensor 79 for detecting the rotational angle θ of steering wheel 7. Furthermore, controller 141 controls traveling electromagnetic proportional valve 61 and steering electromagnetic proportional valve 62 so as to realize real vehicle-center speed Vc, real turning-inside speed Vi and real turning-outside speed Vo every when any steering angle is calculated in this way.

In fact, there is needed a process for calculating a current value for energizing the solenoid of each of electromagnetic proportional valves 61 and 62 on the basis of voltages detected by angle sensors 78 and 79. This process will be described in accordance with FIGS. 8 to 15.

Electromagnetic solenoids 61a, 61b, 62a and 62b are standardized so as to have the same sized effective ranges for their respective output currents I from 0 (ampere) to $I_{MAX}$ (amperes).

Figure 8:
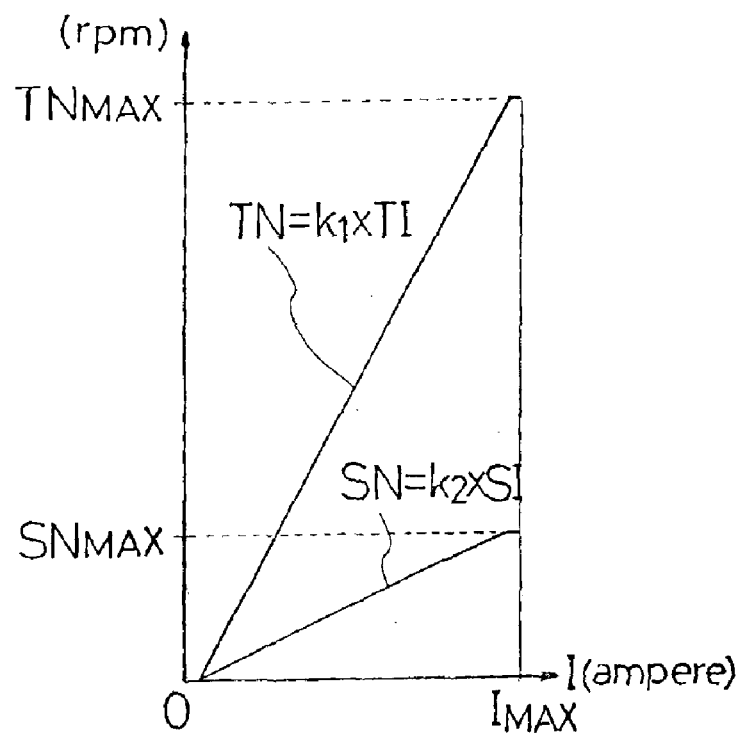
FIG. 8 illustrates respective graphs of an output rotary speed TN of the traveling HST and an output rotary speed SN of the steering HST, in relation to a current I of the solenoid.

As shown in FIG. 8, an output rotary speed TN (rpm) of traveling HST 110 is essentially increased from 0 to $TN_{MAX}$ in proportion to increase of either a forward-traveling current $TI_F$ serving as an output current of forward-traveling electromagnetic solenoid 61a or a backward-traveling current $TI_R$ serving as an output current of backward-traveling electromagnetic solenoid 61b. A traveling current TI is given to these output currents $TI_F$ and $TI_R$ as a generic name. It results in $TN=k_1*TI$, while $k_1$ is a proportionality factor.

Besides, an output rotary speed SN (rpm) of steering HST 120 is essentially increased from 0 to $SN_{MAX}$ in proportion to increase of either a right-turning current $SI_R$ serving as an output current of right-turning electromagnetic solenoid 62a or a left-turning current $SI_L$ serving as an output current of left-turning electromagnetic solenoid 62b. A steering current SI is given to these output currents $SI_R$ and $SI_L$ as a generic name. It results in $SN=k_2*SI$, while $k_2$ is a proportionality factor.

A range where current value I is close to 0 so as to maintain both TN and SN to 0, and a range where current value I is close to maximum $I_{MAX}$ so as to keep $TN=TN_{MAX}$ and $SN=SN_{MAX}$ may be neglected The voltage detected by angle sensor 78 expressing the position of main speed change lever 77 is named TV (volts), and the voltage detected by angle sensor 79 expressing the position of steering wheel 7 is named SV (volts).

Figure 9:
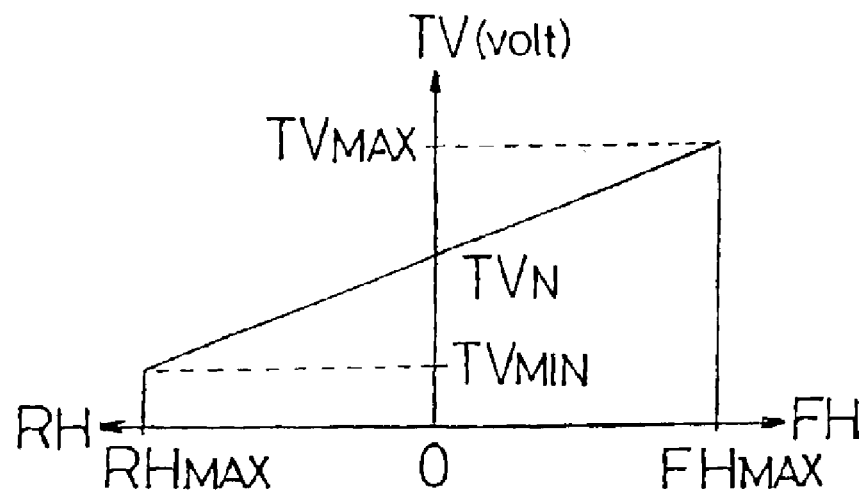
FIG. 9 is a graph of a detected voltage TV of an angle sensor for the main speed change lever in relation to stroke H of the main speed change lever.

FIG. 9 illustrates a correlation between stroke H of main speed change lever 77 from its neutral position and detected voltage TV of angle sensor 78. Stroke H of main speed change lever 77 at the neutral position is 0. The stroke thereof in a range for forward traveling of the vehicle is named a forward-traveling stroke FH, and its maximum stroke is named $FH_{MAX}$. The stroke thereof in a range for backward traveling of the vehicle is named a backward-traveling stroke RH, and its maximum stroke is named $RH_{MAX}$. While stroke H varies from maximum backward-traveling stroke $RH_{MAX}$ through the neutral stroke 0 to maximum forward-traveling stroke $RH_{MAX}$, detected voltage TV proportionally increases from minimum value $TV_{MIN}$ to maximum value $TV_{MAX}$ through an intermediate value $TV_N$ corresponding to H=0.

Figure 10:
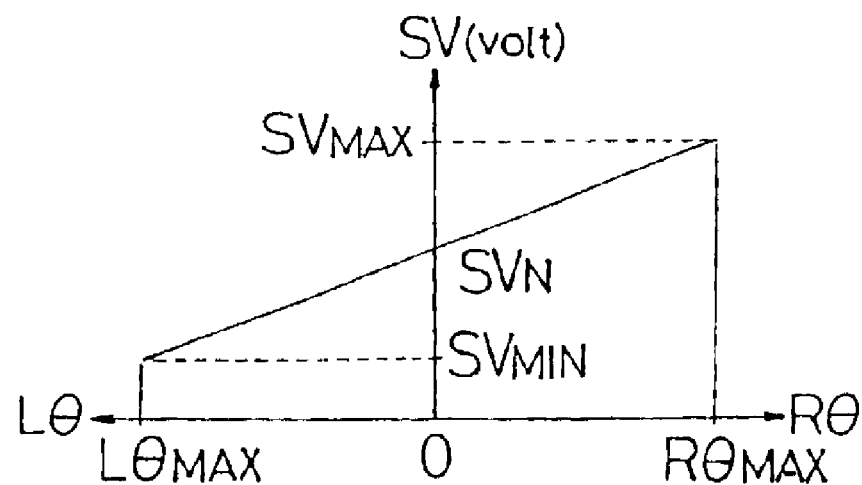
FIG. 10 is a graph of a detected voltage SV of an angle sensor for a steering wheel in relation to steering angle θ of the steering wheel.

FIG. 10 illustrates a correlation between steering angle θ and detection current value SV of angle sensor 79. Steering angle θ at the neutral position (the straight-traveling position) of steering wheel 7 is 0. Steering angle θ for right-turning of the vehicle is named right-turning angle Rθ($\geq$0), and steering angle θ for left-turning of the vehicle is named left-turning angle Lθ($\geq$0). While steering wheel 7 is rotated from maximum left-turning angle $Lθ_{MAX}$ through the neutral position (where θ=0) to maximum right-turning angle $Rθ_{MAX}$, current value SV proportionally increases from minimum value $SV_{MIN}$ to maximum value $SV_{MAX}$ through an intermediate value $SV_N$ corresponding to the neutral position.

Figure 11:
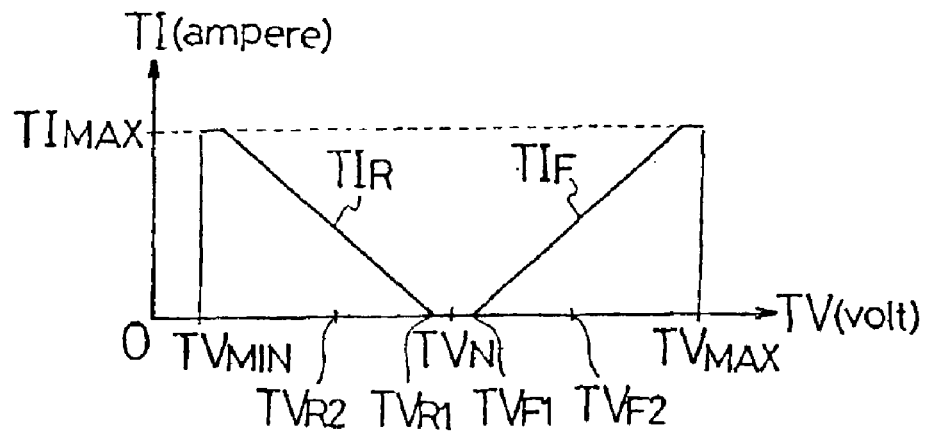
FIG. 11 illustrates respective graphs of output current $TI_F$ of a forward-traveling solenoid and output current $TI_R$ of a backward-traveling solenoid when the vehicle travels straight, in relation to detected voltage TV.

FIG. 11 illustrates respective graphs of forward-traveling current value $TI_F$ and backward-traveling current value $TI_R$ in relation to detected voltage TV when the vehicle travels straight, that is, the time of $0\leq θ\leq θ_1$. A stroke range of main speed change lever 77 from back-traveling stroke $RH_1$ to forward-traveling stroke $FH_1$ through the neutral position serves as a neutral range (for making V=0). Detected voltage TV of angle sensor 79 corresponding to $RH_1$ is named $TV_{R1}$, and that corresponding to $FH_1$ is named $TV_{F1}$. In the case of $TV_{R1}<TV<TV_{F1}$, current values $TI_F$ and $TI_R$ are maintained in 0.

Forward-traveling current $TI_F$ proportionally increases from 0 to maximum value $I_{TMAX}$ while detected voltage TV varies from $TV_{F1}$ to maximum value $TV_{MAX}$ corresponding to the maximum forward-traveling speed. Backward-traveling current $TI_R$ proportionally increases from 0 to maximum value $I_{TMAX}$ while detected voltage TV varies from $TV_{R1}$ to minimum value $TV_{MIN}$ corresponding to the maximum backward-traveling speed.

That is, currents $TI_F$ and $TI_R$ for straight-traveling of the vehicle is calculated through Formula VIII with detected voltage TV while a (>0) serves as a fixed proportionality factor.

At the time of $TV\leq TV_{R1}$, $TI_R-a*(TV-TV_{R1})$ $TI_F=0$

At the time of $TV_{R1}<TV<TV_{F1}$, $TI_F=TI_R=0$

At the time of $TV\geq TV_{F1}$, $TI_F=a*(TV-TV_{F1})$ $TI_R=0$  Formula VIII

Accordingly, in connecting with above-mentioned Formulas II to IV for calculating real vehicle-center speed Vc, steering angle θ (Rθ for right-turning or Lθ for left-turning) can be calculated with voltage SV on the basis of the graph shown in FIG. 10. Furthermore, either $TI_F$ or $TI_R$ replaces straight-traveling speed V and is replaced with a current value calculated through Formula VIII on the basis of detected voltage TV so that a standard forward-traveling current $TI_{FC1}$ replaces Vc1 in forward traveling of the vehicle, a standard backward-traveling current $TI_{RC1}$ replaces Vc1 in backward traveling of the vehicle, an additional forward-traveling current $TI_{FC2}$ replaces Vc2 in forward-traveling of the vehicle, and an additional backward-traveling current $TI_{RC2}$ replaces Vc2 in backward-traveling of the vehicle. Therefore, each of forward-traveling current $TI_{FC}$ for creating real vehicle-center speed Vc every steering angle θ in forward-traveling of the vehicle and backward-traveling current $TI_{RC}$ for creating real vehicle-center speed Vc every steering angle θ in backward-traveling of the vehicle can be calculated on the basis of detected voltage TV.

Consequently, the graph of standard vehicle-center speed Vc1 in relation to steering angle θ in FIG. 6 may be replaced with a graph of standard forward-or-backward-traveling current value $TI_{FC1}$ or $TI_{RC1}$ in relation to either steering angle Rθ or Lθ. Also, the graph of additional vehicle-center speed Vc2 in relation to steering angle θ in FIG. 6 may be replaced with a graph of additional forward-or-backward-traveling current value $TI_{FC2}$ or $TI_{RC2}$ in relation to either steering angle Rθ or Lθ.

In FIG. 11, a voltage $TV_{F2}$ corresponds to a stroke H2 of main speed change lever 77 for forward traveling of the vehicle, named $FH_2$, which concerns the determination of above-mentioned driving coefficient K. Also, a voltage $TV_{R2}$ corresponds to a stroke H2 thereof for backward traveling of the vehicle, named $RH_2$. The graph of driving coefficient K in relation to stroke H in FIG. 7 may be replaced with a graph of driving coefficient K either when detected voltage TV increases from $TV_N$ to $TV_{MAX}$ or when detected voltage TV decreases from $TV_N$ to $TV_{MIN}$.

Then, in Formula VI' on the basis of Formula VII', Vs and V are substituted for SN and TN, respectively, so as to form an equality for calculating output rotary speed SN of steering HST 120 every steering angle θ on the basis of output rotary speed TN of traveling HST 110 set for straight traveling of the vehicle. Furthermore, since it is materialized of $TN=k_1*TI$, output rotary speed TN is substituted for $k_1*TI_F$ or $k_1*TI_R$. Further, SN is substituted for $k_2*SI$.

Therefore, an equality is materialized so as to calculate current SI on the basis of steering angle θ and detected voltage TV. According to the graph of FIG. 10, an arbitrary steering angle θ (which is right steering angle Rθ or left steering angle Lθ) is substituted for a corresponding voltage SV so as to get a following equality for calculating both right-turning current $SI_R$ and left-turning current $SI_L$ on the basis of voltage SV.

At the time of $SV \leq SV_{L1}$, $SI_R=0$ $SI_L=-K*TI_F*b*(SV-SV_{L1})$ or $SI_L=-K*TI_R*b*(SV-SV_{L1})$ At the time of $SV_{L1}<SV<SV_{R1}$, $SI_L=SI_R=0$ At the time of $SV \leq SV_{L1}$, $SI_L=0$ $SI_R=K*TI_F*b*(SV-SV_{L1})$ or $SI_R=K*TI_R*b*(SV-SV_{L1})$     Formula IX In Formula IX, b(>0) is a fixed proportionality factor which is decided by Formula VI' on the basis of Formula VII' with substitution of Vs for $k_2*SI$ and substitution of V for $k_1*TI_F$ or $k_1*TI_R$ and according to the relation of current value to right steering angle Rθ and left steering angle Lθ illustrated by FIG. 10.

Furthermore, $TI_F$ and $TI_R$ are calculated with Formula VIII on the basis of voltage TV. Consequently, right-turning current $SI_R$ and left-turning current $SI_L$ can be decided on the basis of detected voltage TV of angle sensor 78 for main speed change lever 77 and detected voltage SV of angle sensor 79 for steering wheel 7.

Figure 12:
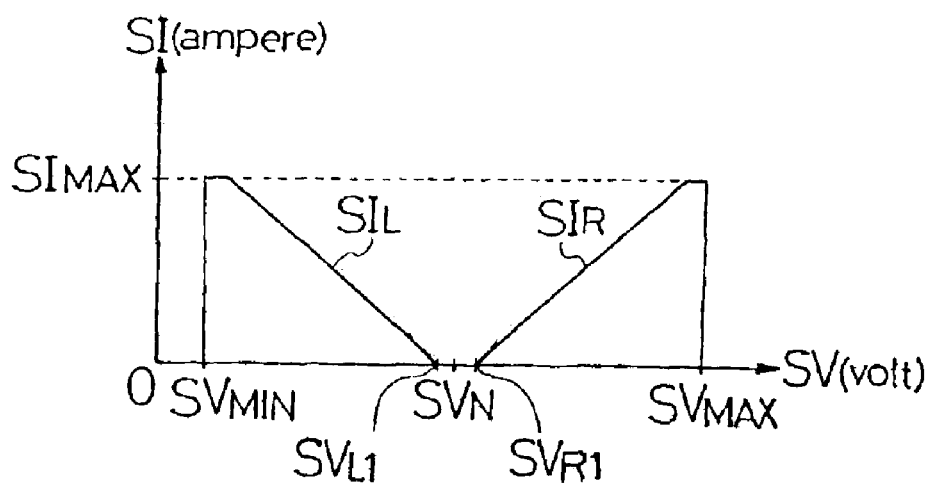
FIG. 12 illustrates respective graphs of output current $SI_R$ of a right-turning solenoid and output current $SI_L$ of a left-turning solenoid when the vehicle travels straight, in relation to detected voltage TV.

According to Formula IX, when main speed change lever 77 is put at one setting position, there is established a graph for setting right-turning current $SI_R$ and left-turning current $SI_L$ in relation to detected voltage SV, as shown in FIG. 12. $K*TI_F*b$ and $-K*TI_F*b$ in Formula IX correspond to the inclinations of the graph. Therefore, the inclination of this graph and maximum current value $I_{SMAX}$ vary according to the variation of straight-traveling speed V set by lever 77 (i.e., detected voltage TV of angle sensor 78) and according to the variation of driving coefficient K which becomes variable when lever 77 is within a certain setting range ($RH_2<H<FH_2$).

Description will now be given of processes for electrically controlling respective solenoids of electromagnetic proportional valves 61 and 62 on the basis of detection by angle sensors 78 and 79 in accordance with FIGS. 13 to 15, so as to describe the process for controlling the outputs of traveling HST 110 and steering HST 120 by manipulation of main speed change lever 77 and steering wheel 7.

Figure 13:
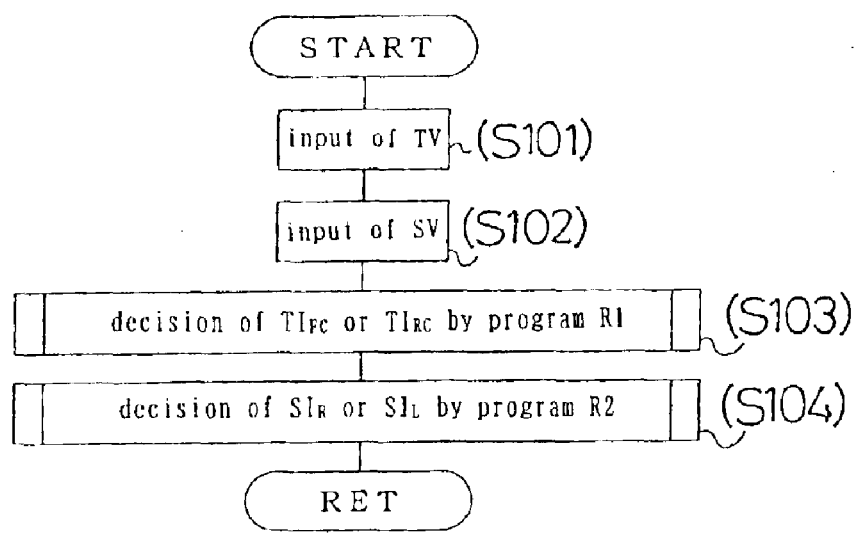
FIG. 13 is a basic flowchart for calculating output currents $TI_{FC}$, $TI_{RC}$, $SI_R$ and $SI_L$ according to voltages TV and SV.
Figure 14:
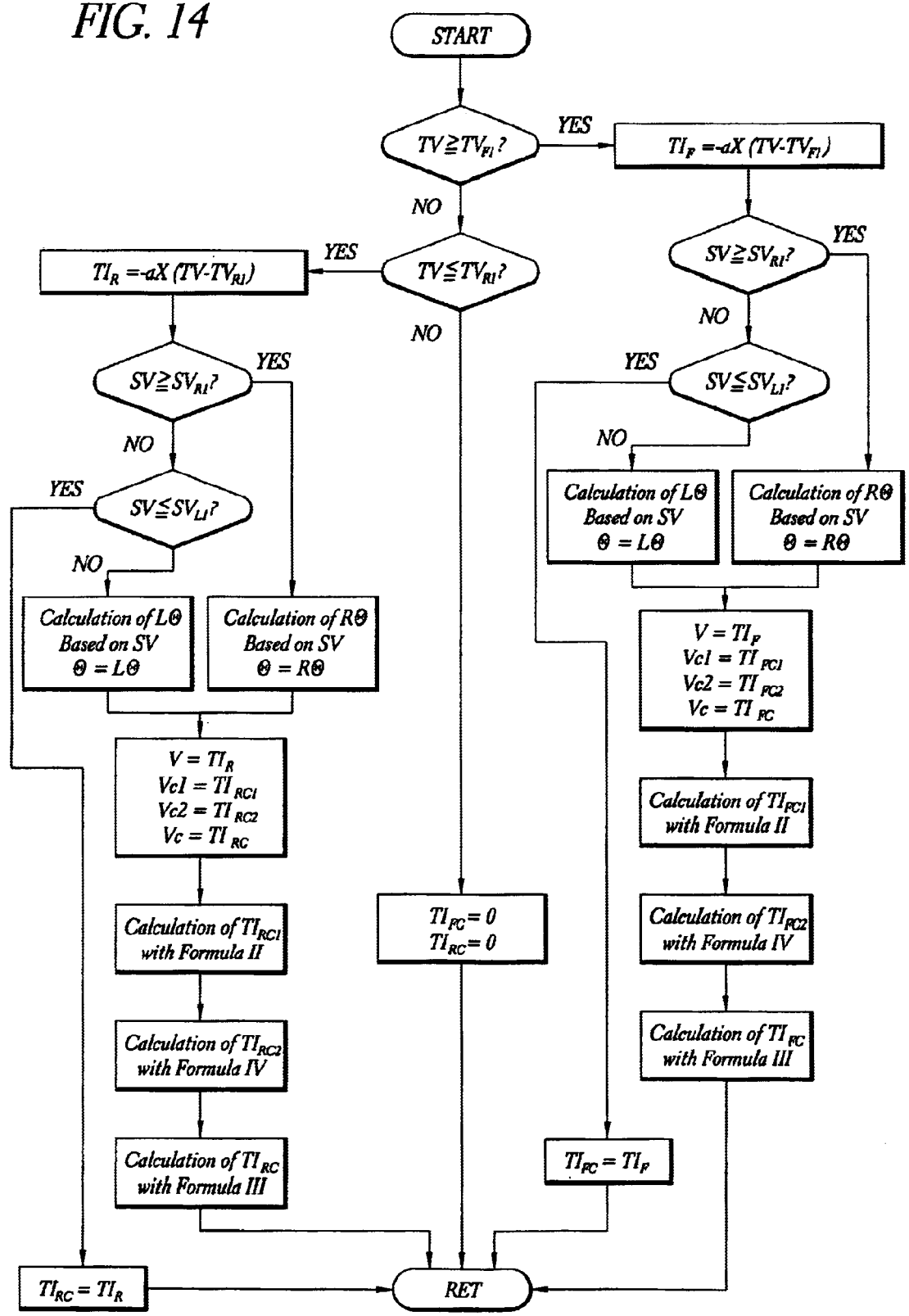
FIG. 14 is a flowchart of a program R1 for calculating output currents $TI_{FC}$ and $TI_{RC}$ for forward and backward traveling of the vehicle according to voltages TV and SV.

The outputs of valves 61 and 62 are basically controlled through the controlling process shown in FIG. 13. In this regard, voltage TV is inputted from angle sensor 78 (step S101), and voltage SV is inputted from angle sensor 79 (step S102). The output of traveling HST 110 is controlled through an output current controlling program R1 for traveling electromagnetic proportional valve 61 (step S103), and the output of steering HST 120 is controlled through an output current controlling program R2 for steering electromagnetic proportional valve 62 (step S104).

Output current controlling program R1 for traveling electromagnetic proportional valve 61 will be described in accordance with FIG. 14. First, inputted voltage TV is applied into Formula VIII. At the time of $TV_{R1}<TV<TV_{F1}$ (step S201), both forward-traveling current value $TI_F$ and backward-traveling current value $TI_R$ are 0 so as to set the straight-traveling speed to 0 (step S202). At the time of $TV \geq TV_{F1}$ (step S203), forward-traveling current value $TI_F$ for creating forward straight-traveling speed V is calculated through the equality of $TI_F=a*(TV-TV_{R1})$ on the basis of detected voltage TV (step S204). At this time, backward-traveling current value $TI_R$ is 0 (omitted in FIG. 14). And at the time of $TV \leq TV_{R1}$ (step S215), backward-traveling current value $TI_R$ for creating backward straight-traveling speed V is calculated through the equality of $TI_R=a*(TV-TV_{F1})$ on the basis of detected voltage TV (step S216). At this time, forward-traveling current value $TI_F$ is 0 (omitted in FIG. 14).

Whether the vehicle travels forward or backward, if the detection of voltage SV results in $SV_{R1}<SV<SV_{F1}$ (step S205 or S217), the vehicle is made to travel straight. That is, either forward-traveling current $TI_{FC}$ or backward-traveling current $TI_{RC}$ for creating real vehicle-center speed Vc is maintained to $TI_F$ or $TI_R$ for straight traveling (step S206 or S218).

It is assumed that the vehicle travels forward. If it is materialized that $SV \geq SV_{R1}$ (step S207), the vehicle turns right so that right steering angle Rθ is calculated on the basis of the graph of FIG. 9, and θ is substituted for calculated Rθ in Formulas II and IV (step S208). If it is materialized that $SV \leq SV_{L1}$ (step S209), the vehicle turns left so that left steering angle Lθ is calculated on the basis of the graph of FIG. 9, and θ is substituted for calculated Lθ in Formulas II and IV (step S210). Furthermore, $V=TI_F$, $Vc1=TI_{FC1}$, $Vc2=TI_{FC2}$ and $Vc=TI_{FC}$ are materialized (step S211), and they are applied into Formula II so as to calculate standard vehicle-center current value $TI_{FC1}$ for creating standard vehicle-center speed Vc1 (step S212), applied into Formula IV so as to calculate additional vehicle-center current value $TI_{FC2}$ for creating additional vehicle-center speed Vc2 (step S213), and applied into Formula III so as to calculate real vehicle-center current value $TI_{FC}$ of electromagnetic solenoid 61 a for creating real vehicle-center speed Vc every arbitrary steering angle in forward traveling of the vehicle (step S214).

It is assumed that the vehicle travels backward. If it is materialized that $SV \geq SV_{R1}$ (step S219), the vehicle turns right so that right steering angle Rθ is calculated on the basis of the graph of FIG. 9, and θ is substituted for calculated Rθ in Formulas II and IV (step S220). If it is materialized that $SV \leq SV_{L1}$ (step S221), the vehicle turns left so that left steering angle Lθ is calculated on the basis of the graph of FIG. 9, and θ is substituted for calculated Lθ in Formulas II and IV (step S222). Furthermore, $V=TI_F$, $Vc1=TI_{RC1}$, $Vc2=TI_{RC2}$ and $Vc=TI_{RC}$ are materialized (step S223), and they are applied into Formula II so as to calculate standard vehicle-center current value $TI_{FC1}$ for creating standard vehicle-center speed Vc1 (step S224), applied into Formula IV so as to calculate additional vehicle-center current value $TI_{RC2}$ for creating additional vehicle-center speed Vc2 (step S225), and applied into Formula III so as to calculate real vehicle-center current value $TI_{RC}$ of electromagnetic solenoid 61b for creating real vehicle-center speed Vc every arbitrary steering angle in backward traveling of the vehicle (step S226).

Output current controlling program R2 for steering electromagnetic proportional valve 62 will now be described in accordance with FIG. 15.

First, inputted voltage TV is measured so as to determine driving coefficient K (step S301). At the time of $TV_{R2} \leq TV \leq TV_{F2}$ (step S201), voltage TV is substituted for either forward-traveling stroke FR or backward-traveling stroke RH so as to materialize $K=f_2(FH)$ or $K=f_2(RH)$ (step S302). At the time of $TV>TV_{F2}$ or $TV<TV_{R2}$, K=0 is materialized (step S303).

Then, it is judged whether detected voltage TV is greater or smaller than voltage $TV_{F1}$ so as to decide whether main speed change lever 77 is set for forward traveling or not (step S304). If it is detected that $TV<TV_{F1}$, it is further judged whether detected voltage TV is greater or smaller than voltage $TV_{R1}$ so as to decide whether main speed change lever 77 is set for backward traveling or not (step S305). If it is decided that main speed change lever 77 is not set for backward traveling, it is set in neutral so that both forward-traveling and backward-traveling currents $TI_F$ and $TI_R$ are set to 0 (step S306).

When it is judged to be set for forward traveling, $TI_F = a*(TV-TV_{F1})$ is materialized according to Formula VIII, and current $TI_F$ corresponding to forward straight-traveling speed is calculated on the basis of detected voltage TV (step S307). At this time, $TI_R$ si 0 (omitted in FIG. 15). When it is judged to be set for backward traveling, $TI_R = -a*(TV-TV_{R1})$ is materialized according to Formula VIII, and current $TI_R$ corresponding to backward straight-traveling speed is calculated on the basis of detected voltage TV (step S313). At this time, $TI_F$ is 0 (omitted in FIG. 15).

Whether the vehicle travels forward or backward, it is judged whether detected voltage SV is greater or smaller than voltage $SV_{R1}$ so as to decide whether steering wheel 7 is set for right turning or not (step S308 or S314). If it is detected that $SV<SV_{R1}$, it is further judged whether detected voltage SV is greater or smaller than voltage $SV_{L1}$ so as to decide whether steering wheel 7 is set for left turning or not (step S309 or S315). If it is decided that steering wheel 7 is not set for left turning, it is set for straight traveling so that both right-turning and left-turning currents $TI_F$ and $TI_R$ are set to 0 (step S310 or S316).

Figure 15:
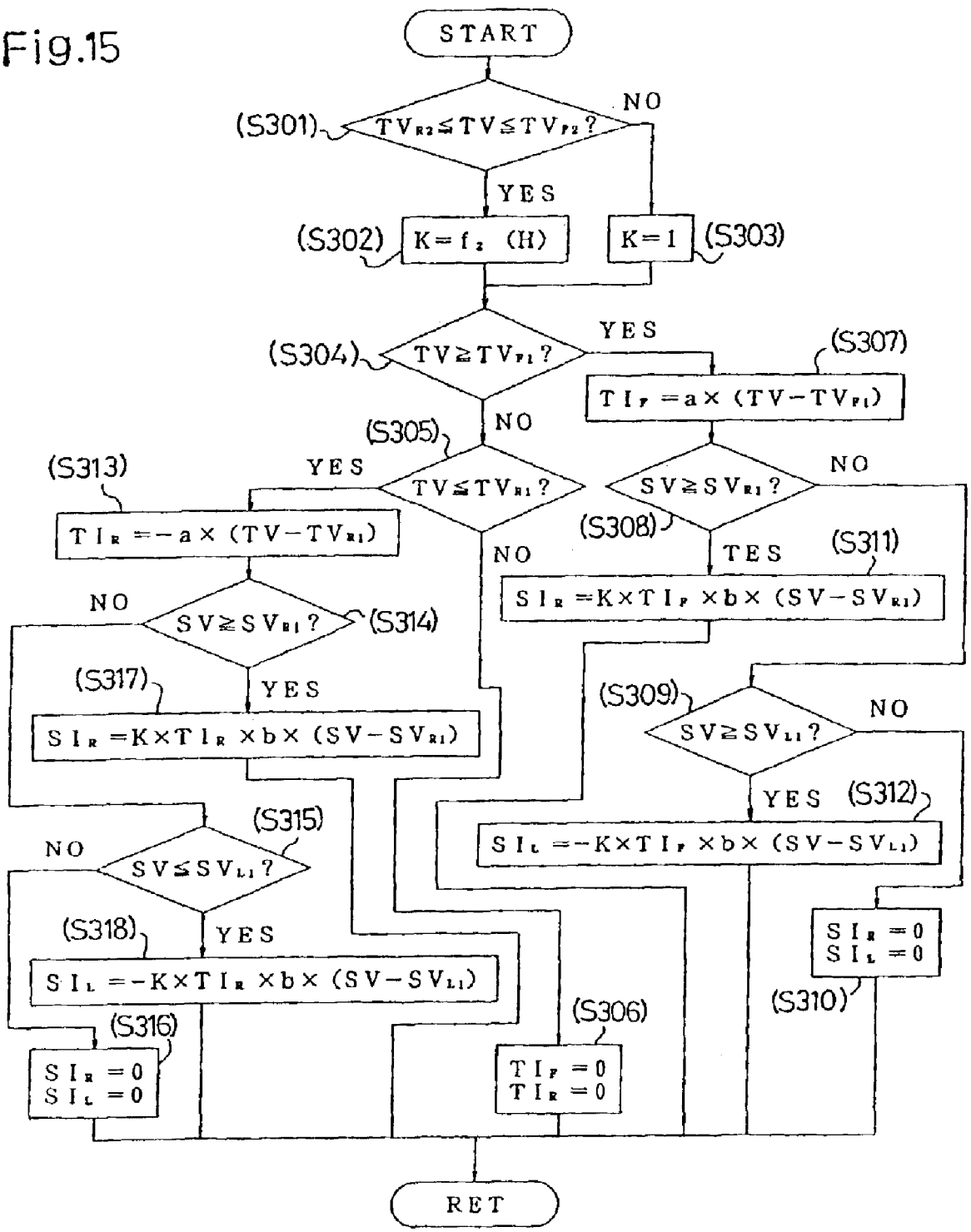
FIG. 15 is a flowchart of a program R2 for calculating output currents $SI_R$ and $SI_L$ for right and left turning of the vehicle according to voltages TV and SV.

Whether the vehicle travels forward or backward, the vehicle turns right at the time of $SV \leq SV_{R1}$ so that right-turning current value $SI_R$ is calculated through Formula IX (step S311 or S317), and left-turning current value $SI_L$ is 0 (omitted in FIG. 15). The vehicle turns left at the time of $SV \leq SV_{L1}$ so that left-turning current value $SI_L$ is calculated through Formula IX (step S312 or S318), and right-turning current value $SI_R$ is 0 (omitted in FIG. 15).

In this way, corresponding to detections of angle sensor 78 for main speed change lever 77 and angle sensor 79 for steering wheel 7, either current $TI_{CF}$ of solenoid 61a or current $TI_{CR}$ of solenoid 61b for creating real vehicle-center speed Vc is calculated through program R1 for traveling electromagnetic valve 61, and either current value $SI_R$ of solenoid 62a or current value $SI_L$ of solenoid 62b for creating steering output speed Vs is calculated through program R2 for steering electromagnetic valve 62. Then, the output of each solenoid is controlled so as to create speed Vi of inside crawler traveling device I in turning and speed Vo of outside crawler traveling device 1 in turning.

The above description has been given of control of electromagnetic proportional valves 61 and 62 for controlling respective movable swash plates 111a and 121a of both HSTs 110 and 120 during turning of the vehicle while main speed change lever 77 is fixed in location.

Next, description will be given of control of traveling electromagnetic proportional valve 61 when main speed change lever 77 is shifted for acceleration or deceleration.

For example, it is assumed that main speed change lever 77 is suddenly shifted for acceleration so as to increase detected voltage of angle sensor 78 from $TV_1$ to $TV_2$ ($>TV_1$) while the vehicle travels straight. Current $TI_F$ of energized solenoid 61a corresponding to detected voltage $TV_1$ is named $TI_{F1}$, and that corresponding to detected voltage $TV_2$ is named $TI_{F2}$. Essentially, current TI increases from $TI_{F1}$ to $TI_{F2}$ synchronously to displacement of voltage TV so as to increase the output of traveling HST 110 at a sitting. However, such a sudden increase of output of traveling HST 110 shocks a driver and damages parts.

Therefore, in connection with a current displacement speed TI', which serves as a displacement degree of current value TI of traveling electromagnetic proportional valve 61 (solenoid 61a or 61b) every unit of time to (whether the vehicle travels forward or backward), $TI'_{MAX}$ is predetermined. When current displacement speed TI' corresponding to the shift speed of shifted main speed change lever 77, i.e., displacement speed TV' of voltage TV is equal to or under $TI'_{MAX}$, output current value TI of traveling electromagnetic proportional valve 61 varies synchronously to displacement of voltage TV. If current displacement speed TI' exceeds $TI'_{MAX}$, output current value TI of valve 61 varies at a speed according to current displacement speed $TI'_{MAX}$.

Namely, when the shift speed of lever 77 exceeds the speed corresponding to maximum current displacement speed TI', current TI increases or decreases at $TI'_{MAX}$ every time unit so as to approach current value TI corresponding to voltage TV detected after completion of the shift.

Figure 16:
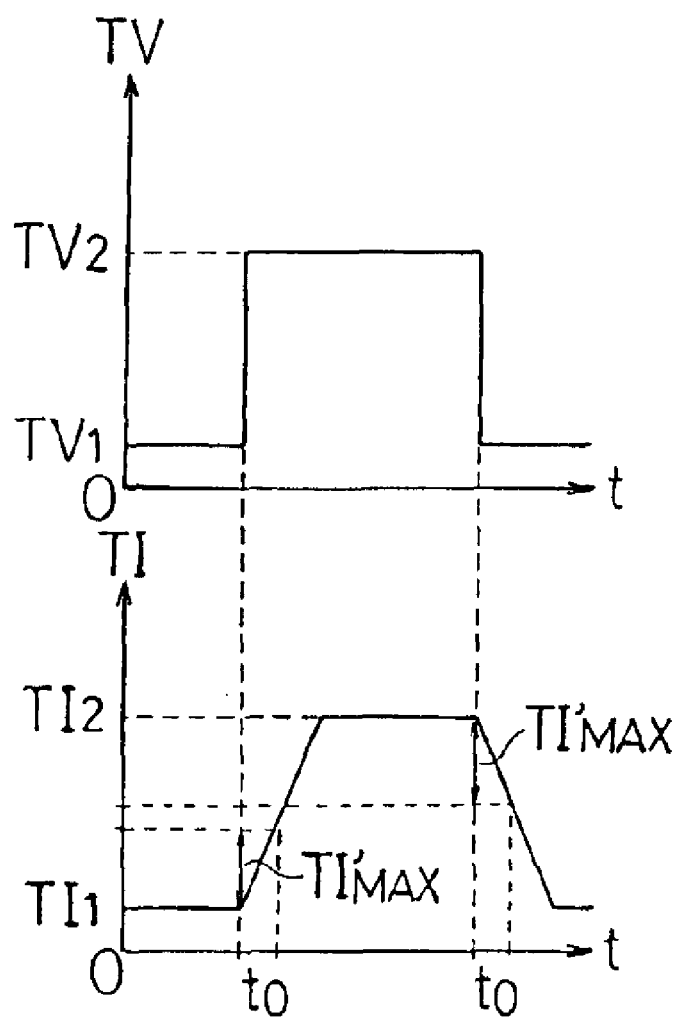
FIG. 16 illustrates respective graphs of voltage TV of the sensor for detecting the position of the main speed change lever and current TI of the solenoid for the traveling HST, sharing a common time axis t, on the assumption that an upper limit of the displacement speed of current TI is established.

FIG. 16 illustrates variation of voltage TV and current TI sharing the same axis of time t. Whether the shift is for acceleration or deceleration, maximum current displacement speed $TI'_{MAX}$ is constant in this embodiment. Alternatively, $TI'_{MAX}$ may be different. It may be also different depend upon which direction the vehicle travels in forward or backward. Furthermore, it may be fit for the shift across ranges for forward traveling and backward traveling.

Consequently, even if main speed change lever 77 is manipulated quickly, the output displacement speed of traveling HST 110 can be restricted under a certain value so as to avoid sudden acceleration and deceleration of the vehicle.

Incidentally, maximum current displacement speed $TI'_{MAX}$ may also serve as respective current displacement speeds of the solenoids in later-discussed control of traveling HST 110 and steering HST 120 for their neutralization and restoring of output at the time of braking.

Description will be given of braking control according to the present invention. Conventionally, braking operation is separate from operation for neutralizing the HST so that a driver must shift the speed change lever for regulating output of the HST to the neutral position and separately operate for braking the driving sprockets surely (usually, this braking operation is depression of a pedal). In the case of slamming on the brake, the driving sprockets are braked while they are driven because there is no time for returning the speed change lever to the neutral position. Thus, there arises a friction wearing relevant components.

According to the present invention, the HST-neutralization operation and the braking operation are performed in a double action by manipulation of only brake pedal 51. Namely, brake pedal 51 is also used as a clutch pedal.

Description will now be given of brake pedal 51, a sensor for detecting the position of brake pedal 51, and a linkage 40 interposed between brake pedal 51 and brake device 58.

Brake pedal 51 is a foot pedal suspended so as to be rotatable around a pedal support shaft 52 disposed laterally in dashboard 50. A spring 59 biases brake pedal 51 upward.

Brake device 58 is of a wet multi-disc type, for example. As shown in FIG. 2, within housing 131, brake device 58 is disposed around input shaft 130 of differential unit 132, which is connected with transmission shaft 72. Brake device 58 directly brakes shaft 130, thereby braking both sprockets 11 of left and right crawler traveling devices 1 simultaneously.

Figure 17:
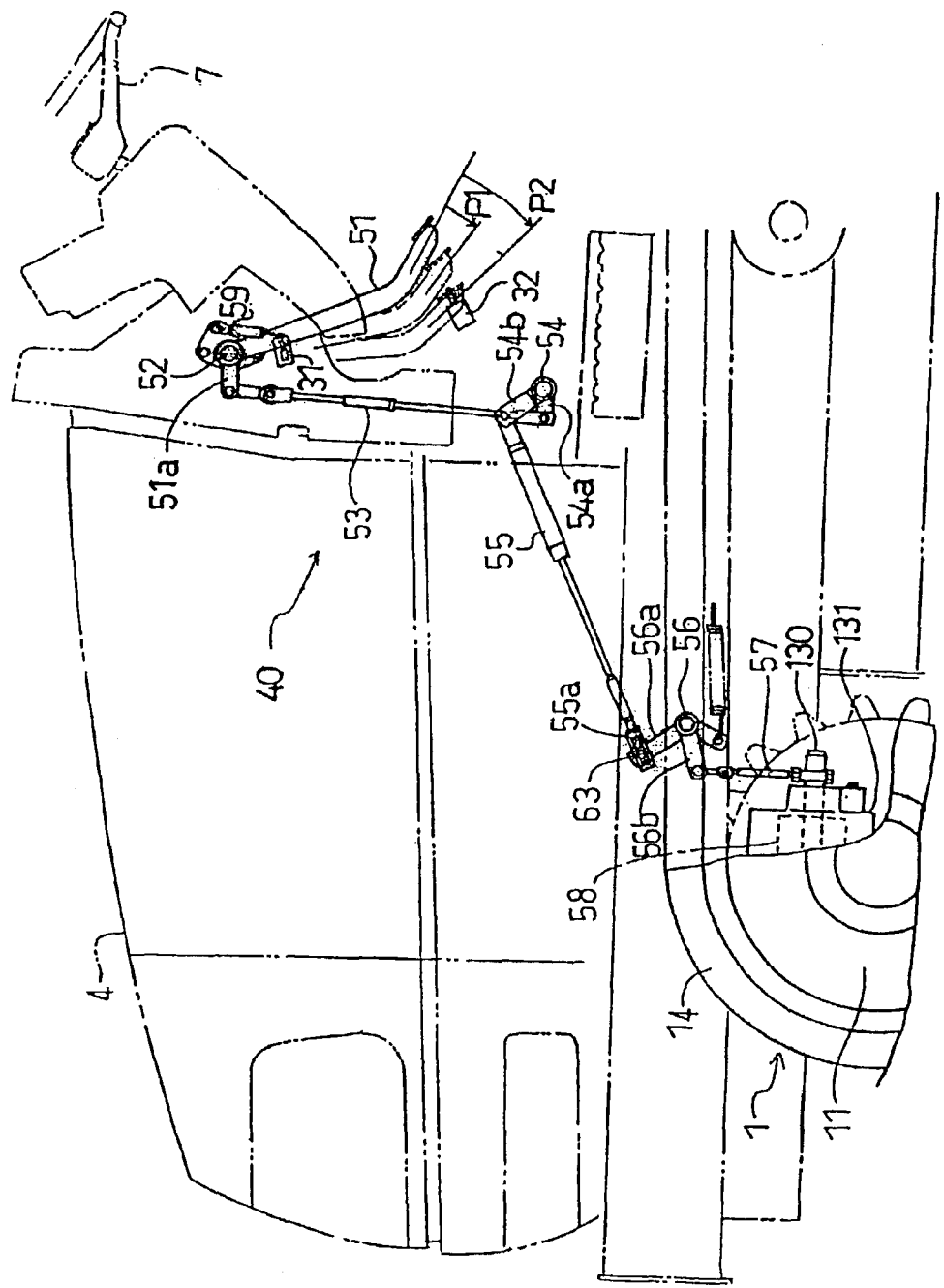
FIG. 17 is a side view of a linkage from a brake pedal to a brake device.

Brake device 58 according to this embodiment is switched between a braking mode and a release mode by pushing and pulling shaft 130 in its axial direction (i.e., in the longitudinal direction of the vehicle). Shaft 130 can be pulled and pushed within a backlash range of the bevel gears. Brake linkage 40 is interposed between shaft 130 and brake pedal 51 so as to push and pull shaft 130, as shown in FIG. 17.

Brake linkage 40 will be described. A first fulcrum shaft 54 is disposed laterally below shaft 52. An approximately vertical connection rod 53 pivotally connects an arm 51a, which rotates integrally with brake pedal 51, and an arm 54a, which is rotatable around shaft 54 so as to be pushed and pulled substantially vertically.

Furthermore, an arm 54b is disposed so as to be rotatable integrally with arm 54a around shaft 54. On the other hand, a second fulcrum shaft 56 is disposed laterally above a rear portion of shaft 130 projecting from housing 131, and arms 56a and 56b are disposed so as to be mutually integrally rotatable around shaft 56. Arms 56a and 56b are mutually connected through an approximately longitudinal connection rod 55. Arm 56b and shaft 130 are mutually connected through an approximately vertical rod 57. Arm 56a is connected to rod 55 by inserting a pin fixed on arm 56a into a slot 55a in an utmost end of rod 55. A play of brake pedal 51 is established by a slidable range of the pin of arm 56a within slot 55a.

In this way, brake linkage 40 is so constructed that, by rotating brake pedal 51, rod 53 is pulled or pushed substantially vertically, rod 55 substantially longitudinally, and rod 57 is tilted forward or rearward, thereby sliding shaft 130 longitudinally.

Figure 18:
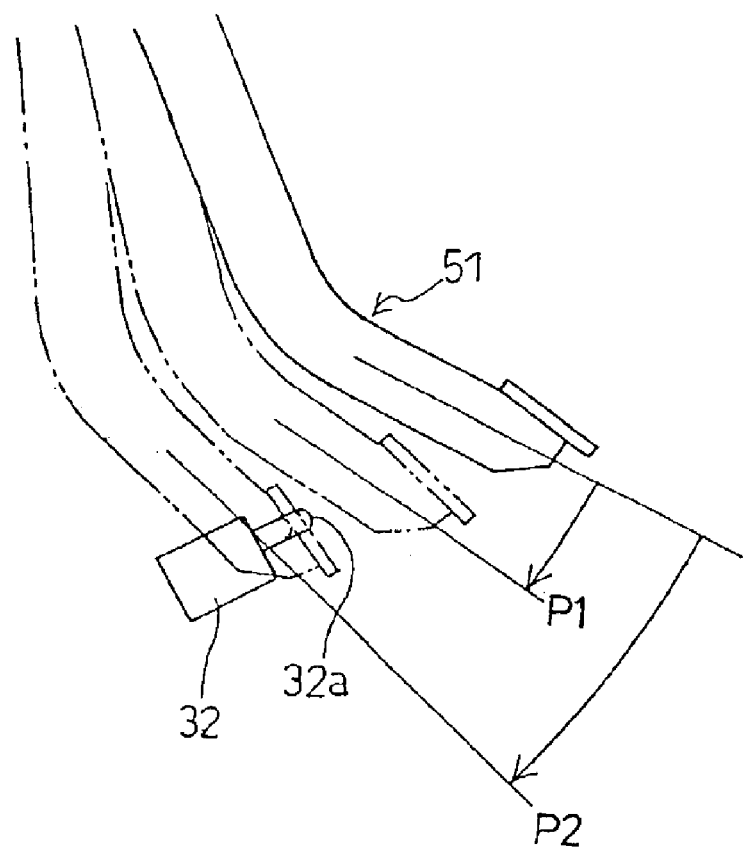
FIG. 18 is a side view of a principal portion showing a positional relation between the brake pedal and a brake pedal switch.

Brake device 58 raises its braking force as the downward rotational angle of brake pedal 51 increases. When brake pedal 51 reaches a position P2 shown in FIG. 18, which is close to the most depressed position, brake device 58 brakes left and right sprockets 11 approximately perfectly.

As shown in FIG. 17, a brake pedal position sensor 31 is disposed adjacently to brake pedal 51 so as to detect the rotational angle (the depression degree) of pedal 51. In this embodiment, sensor 31 is disposed adjacently to an upper end of brake pedal 51. However, sensor 31 may be disposed at any position if it attains the prescribed object.

Brake pedal switch 32 is disposed so as to turn on when brake pedal 51 is depressed to a fixed position. In the embodiment of FIG. 17, switch 32 is located so as to turn on when brake pedal 51 is depressed to position P2. Alternatively, it may be disposed so as to turn on when pedal 51 is depressed to a position P1 which is shallower than position P2.

Switch 32 forcibly brings the output speeds of traveling HST 110 and steering HST 120 into zero. In the case where each of movable swash plates 111a and 121a of HSTs 110 and 120 is connected to both main speed change lever 77 and steering wheel 7 through a mechanical linkage, both HSTs 110 and 120 are neutralized so as to necessarily return main speed change lever 77 to the neutral position and steering wheel 7 to the straight-traveling position. However, according to the present invention, the manipulated positions of main speed change lever 77 and steering wheel 7 are electrically detected, and electromagnetic proportional valves 61 and 62 in the respective hydraulic servomechanisms are electrically controlled on the basis of the detected values so as to move swash plates 111a and 121a. Thus, the positional relation of main speed change lever 77 and steering wheel 7 to movable swash plates 111a and 121a is not fixed. More specifically, main speed change lever 77 is not set to the neutral position even if brake pedal 51 is rotated so as to neutralize traveling HST 110 forcibly. Consequently, when brake pedal 51, which has been depressed so as to neutralize HST 110, becomes unpressed, the traveling speed just before braking is re-created easily because main speed change lever 77 is held at its position before depression of pedal 51.

Furthermore, since the output of traveling HST 110, i.e., real vehicle-center speed Vc, and the output of steering HST 120, i.e., steering output speed Vs are controlled every arbitrary steering angle as mentioned above according to the present invention, brake pedal 51, which has been depressed just after steering wheel 7 is set to a steering angle for left or right turning, becomes unpressed so that the vehicle resumes its turning on a turning radius corresponding to the steering angle which has been set by steering wheel 7.

Description will be given of control of output of the HST on the basis of judge whether switch 32 is set on or off in accordance with FIG. 19.

It is presupposed that detected voltages TV and SV of angle sensors 78 and 79 are inputted (steps S401 and 402). It is judged that switch 32 is set on or off (step S403). If switch 32 is set off, output currents TI and SI of the solenoids are controlled through program R1 for HST110 and program R2 for HST 120 on the basis of both detected voltages TV and SV (steps S404 and S405). If brake pedal 51 is depressed so as to turn on switch 32, HST controller 141 forcibly vanishes current TI of either energized solenoid 61a or 61b in valve 61 and current SI of either energized solenoid 62a or 62b in valve 62 (step S406 and S407), so that both swash plates 111a and 121a are set to respective neutral positions so as to stop the output rotations of respective hydraulic motors 112 and 122.

Figure 19:
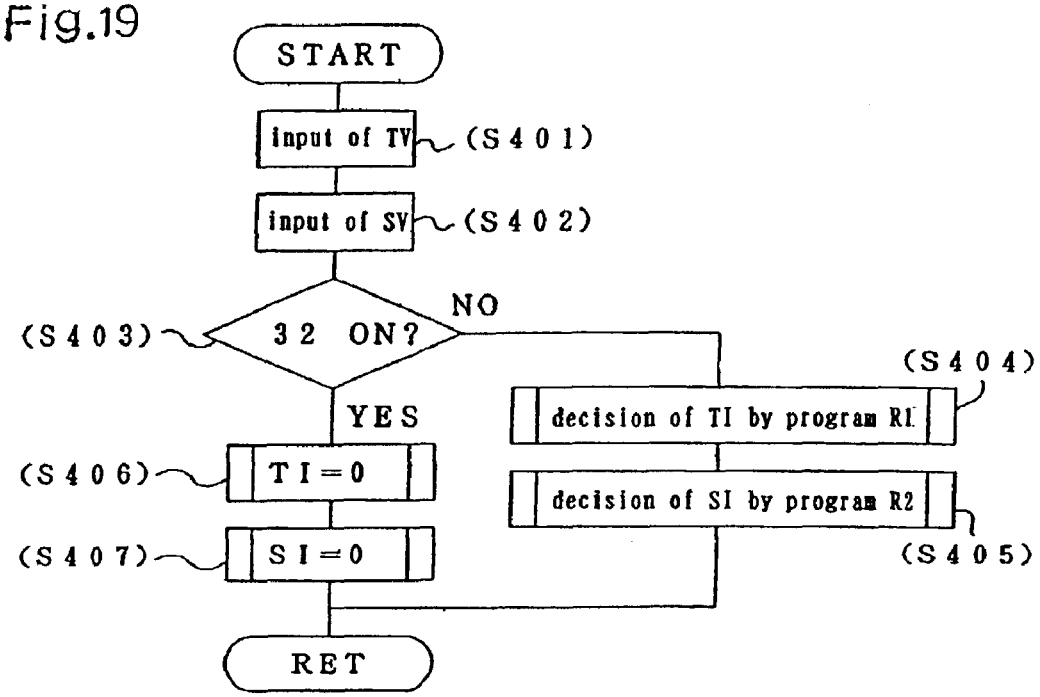
FIG. 19 is a controlling flowchart for vanishing the output speeds of both the HSTs by changing the brake pedal switch during depression of the brake pedal.

In the embodiment of FIG. 19, brake device 58 acts at the same time when both HSTs 110 and 120 become almost neutral because switch 32 turns on when brake pedal 51 is depressed to position P2 which is close to the most depression.

Alternatively, brake pedal 51 may be set so that it turns on when pedal 51 is depressed to position P1 shallower than position P2. Accordingly, in the process of depressing brake pedal 51 to the most depression, brake device 58 acts after both HSTs 110 and 120 become neutral. Namely, the neutralization of HSTs and the braking actuation are performed one after another according to operation of brake pedal 51.

Furthermore, by making the decreasing speed TI' of current equal to or less than a fixed value according to the above-mentioned embodiment of FIG. 16 so as to control the deceleration during neutralization of HSTs 110 and 120, the vehicle is gradually decelerated and finally braked perfectly, thereby reducing the shock in braking. Incidentally, only current TI for forward and backward traveling is referred to in the embodiment of FIG. 16. However, if the vehicle is braked in turning, the decreasing speed of current SI for right and left turning may be similarly decreased in proportion to the decreasing speed of current TI so that the vehicle can be decelerated while it keeps a constant turning radius.

Furthermore, when braking, main speed change lever 77 and steering wheel 7 are not shifted to the respective neutral positions but maintained to their places. Therefore, when brake pedal 51 is returned so as to turn off switch 32, the outputs of HSTs 110 and 120 are controlled by currents TI and SI of the solenoids on the basis of both detected voltages TV and SV again, thereby re-creating the traveling speed just before depression of pedal 51. Even in this case, the vehicle speed can be gradually increased to the original speed so as to reduce the shock in starting of the vehicle because the increasing speeds of currents are restricted.

Figure 20:
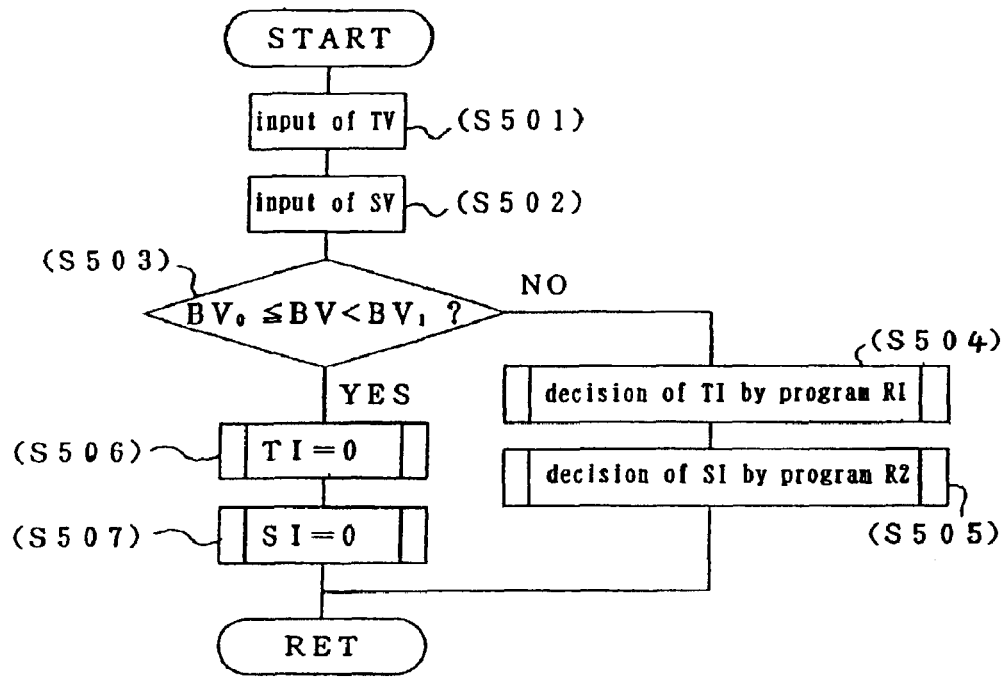
FIG. 20 is a controlling flowchart for vanishing the output speeds of both the HSTs by detection of a brake pedal position sensor during depression of the brake pedal.

Alternatively, both HSTs 110 and 120 may be controlled in their neutralization on the basis of the value detected by brake pedal position sensor 31 instead of switch 32. It is presupposed, for example, that the neutralization of HSTs and the braking actuation are performed one after another, and a voltage BV detected by sensor 31 increases according to depression of brake pedal 51 so that voltage BV becomes $BV_0$ when pedal 51 is unpressed and it becomes $BV_1$ when pedal 51 is depressed to position P1. As shown in FIG. 20, in the state where detected voltages TV and SV of sensors 78 and 79 are inputted (step S501 and S502), voltage BV is measured (step S503). At the time of $BV_0$?BV<$BV_1$, currents TI and SI of the solenoids are controlled through program R1 for HST 110 and program R2 for HST 120 on the basis of both detected voltages TV and SV (step S504 and 505). If BV reaches or exceeds $BV_1$ by depressing brake pedal 51, HST controller 141 forcibly vanishes currents TI and SI regardless of detections of sensors 78 and 79 (step S506 and S507), so that both swash plates 111a and 121a are set to the respective neutral positions so as to stop the output rotations of respective hydraulic motors 112 and 122.

In the case where the detection of sensor 31 is used, currents T1 and S1 to the respective excited solenoids of valves 61 and 62 may be reduced correspondingly to the depressed position of brake pedal 51 until both HSTs 110 and 120 become neutral. Therefore, the degrees of rotary speed reductions of left and right driving sprockets 11 can be adjusted by depression of brake pedal 51. This structure may be used besides the structure for neutralizing both HSTs 110 and 120 by changing switch 32.

Furthermore, if a selsyn motor for starting the engine is turned on electricity only when both HSTs 110 and 120 are set in neutral by depressing brake pedal 51 and brake device 58 is acting for braking, the safety at starting of the engine can be assured.

Figure 21:
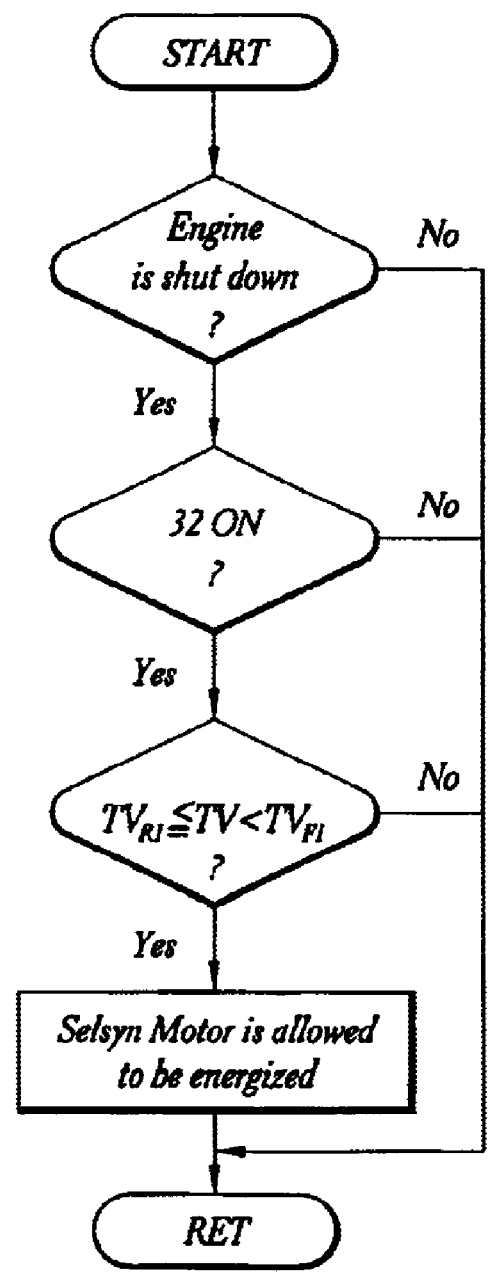
FIG. 21 is a controlling flowchart for making an engine impossible to start after the comprehension of both braking actuation and neutrality of the traveling HST.

FIG. 21 is a flow chart for controlling the selsyn motor in this way. In this case, switch 32 is disposed correspondingly to most-depressed position P2 so as to decide whether brake device 58 is acting for braking or not.

When the engine is stationary (a step S601), it is detected that brake pedal switch 32 is put on so as to confirm that brake device 58 is acting for braking (step S602), and it is confirmed that traveling HST 110 is neutral on the basis of detected voltage TV of sensor 78 (step S603). Then, the selsyn motor becomes possible to be turned on electricity (step S604) so as to allow the engine to start.

While a preferred embodiment has been described, variations thereto will occur to those skilled in the art within the scope of the present invention concepts which are delineated by the following claims.

INDUSTRIAL APPLICABILITY OF THE INVENTION

As mentioned above, by using the present invention, a vehicle such as a crawler traveling vehicle including a crawler tractor, which drives respective HSTs for traveling and steering, can have a compact, light, precise and economic electrically controlled system for controlling the HSTs without a complicated linkage interposed among the speed change operation tool such as a speed change lever, the steering operation tool such as a steering wheel, and the respective movable swash plates of the HSTs.

What is claimed is:

1. A hydraulically driven traveling vehicle, comprising:
a pair of left and right drive axles;
a differential mechanism differentially connecting said pair of drive axles to each other;
a traveling hydrostatic stepless transmission;
a steering hydrostatic stepless transmission, wherein mutually opposite two-flow output rotations of said steering hydrostatic stepless transmission are separately transmitted to said respective drive axles while output rotation of said traveling hydrostatic stepless transmission is transmitted to an input section of said differential mechanism, thereby making said vehicle travel and turn;
a speed change operation tool manipulated by a driver so as to set each speed of said vehicle traveling forward and backward, wherein manipulated variable and direction of said speed change operation tool is converted into an electric signal;
a steering operation tool manipulated by a driver so as to set each turning radius of said vehicle turning left and right, wherein manipulated variable and direction of said steering operation tool is converted into an electric signal;
a pair of electromagnetic solenoids serving as respective output regulating means of said traveling hydrostatic stepless transmission and said steering hydrostatic stepless transmission, wherein an output current value of each of said electromagnetic solenoids is controlled based on both the electric signals resulting from manipulation of said speed change operation tool and said steering operation tool so as to create an output rotary speed of each of said hydrostatic stepless transmissions corresponding to said controlled output current value,
a brake for braking both said left and right drive axles disposed in a transmission system to both said drive axles; and
a brake operation tool for acting said brake, wherein the output current values of said pair of electromagnetic solenoids are electrically controlled so as to vanish the output current values of said traveling hydrostatic stepless transmission and said steering hydrostatic stepless transmission, without changing positions of the speed change operation tool and the steering operation tool, when said brake operation tool is operated at a stroke so as to reach a prefixed neutral setting position,
wherein both of the output of the traveling hydrostatic stepless transmission and the output of the steering hydrostatic stepless transmission are controlled by both of the speed change operation tool and the steering operation tool, whereby the output of the traveling hydrostatic stepless transmission and the output of the steering hydrostatic stepless transmission are correlated with each other.

2. The hydraulically driven traveling vehicle as set forth in claim 1, further comprising: a pair of crawler traveling devices disposed left and right sides of said vehicle respectively, wherein said pair of crawler traveling devices have respective driving sprocket shafts serving as said left and right drive axles.

3. The hydraulically driven traveling vehicle as set forth in claim 1, further comprising: a steering wheel serving as said steering operation tool.

4. The hydraulically driven traveling vehicle as set forth in claim 1, further comprising: a pair of hydraulic servomechanisms serving as respective output regulating means of said traveling hydrostatic stepless transmission and said steering hydrostatic stepless transmission; and a pair of electromagnetic proportional valves serving as respective hydraulic controlling means for said respective hydraulic servomechanisms, wherein said pair of electromagnetic solenoids are provided in said respective electromagnetic proportional valves.

5. The hydraulically driven traveling vehicle as set forth in claim 1, wherein the output current value of said electromagnetic solenoid of said traveling hydrostatic stepless transmission is controlled on the basis of both the electric signals resulting from manipulation of said traveling operation tool and said steering operation tool so that, while said steering operation tool is manipulated from a straight traveling setting position toward a limit position for either left or right turning of said vehicle within a certain range, the output speed of said traveling hydrostatic stepless transmission is almost fixed, and while said steering operation tool is manipulated, beyond said certain range to said limit position, the output speed of said traveling hydrostatic stepless transmission is reduced so that the reduction degree thereof increases as said steering operation tool approaches said limit position.

6. The hydraulically driven traveling vehicle as set forth in claim 5, wherein the output current value of said electromagnetic solenoid of said traveling hydrostatic stepless transmission is so controlled that a ratio of output speed of said traveling hydrostatic stepless transmission when said steering operation tool being set in an arbitrary position to the output speed of said traveling hydrostatic stepless transmission when said steering operation tool being set in said straight traveling setting position is fixed wherever said speed change operation tool is set.

7. The hydraulically driven traveling vehicle as set forth in claim 6, wherein the output current value of said electromagnetic solenoid of said steering hydrostatic stepless transmission is controlled on the basis of both the electric signals resulting from manipulation of said speed change operation tool and said steering operation tool so that a ratio of output speed of said steering hydrostatic stepless transmission when said steering operation tool being set in an arbitrary position to the output speed of said traveling hydrostatic stepless transmission when said steering operation tool being set in said arbitrary position is fixed wherever said speed change operation tool is set.

8. The hydraulically driven traveling vehicle as set forth in claim 7, wherein the output current value of said electromagnetic solenoid of said steering hydrostatic stepless transmission is controlled on the basis of both the electric signals resulting from manipulation of said speed change operation tool and said steering operation tool so that, while said speed change operation tool is set for creating a speed lower than a certain value, a ratio of output speed of said steering hydrostatic stepless transmission when said steering operation tool being set in an arbitrary position to the output speed of said traveling hydrostatic stepless transmission when said steering operation tool being in said arbitrary position is larger than said fixed ratio.

9. The hydraulically driven traveling vehicle as set forth in claim 7, wherein the output current value of said electromagnetic solenoid of said steering hydrostatic stepless transmission is controlled on the basis of both the electric signals resulting from manipulation of said speed change operation tool and said steering operation tool so that, while said steering operation tool is manipulated from said straight traveling setting position to a limit position for either right or left turning of said vehicle, a setting position of said steering operation tool for vanishing the rotary speed of said drive axle on inside of said vehicle in turning, which has been reduced from a speed during the straight traveling of said vehicle, is fixed.

10. The hydraulically driven traveling vehicle as set forth in claim 1, wherein an upper limit is provided to a displacement speed of the output current value of said electromagnetic solenoid for said traveling hydrostatic stepless transmission so that, when said displacement speed corresponding to manipulation speed of said speed change operation tool becomes larger than said upper limit, said output current value of said electromagnetic solenoid for said traveling hydrostatic stepless transmission varies at said upper limit of said displacement speed.

11. The hydraulically driven traveling vehicle as set forth in claim 1, further comprising: a foot pedal serving as said brake operation tool.

12. The hydraulically driven traveling vehicle as set forth in claim 1, further comprising: a switch which changes when said brake operation tool is operated at the stroke so as to reach said neutral setting position, wherein the output current values of said electromagnetic solenoids are controlled by detecting an electric signal as the change of said switch so as to vanish the output speeds of said traveling hydrostatic stepless transmission and said steering hydrostatic stepless transmission.

13. The hydraulically driven traveling vehicle as set forth in claim 1, wherein the displacement speeds of output current values of said electromagnetic solenoids for resetting the output speeds of said traveling hydrostatic stepless transmission and said steering hydrostatic stepless transmission when the stroke of said brake operation tool beyond said neutral setting position is reduced across said neutral setting position are held no more than respective certain values.

14. The hydraulically driven traveling vehicle as set forth in claim 1, wherein said neutral setting position of said brake operation tool is disposed at a position corresponding to a stroke of said brake operation tool which is smaller than a stroke thereof corresponding to a braking position for acting said brake.

15. The hydraulically driven traveling vehicle as set forth in claim 14, wherein the displacement speeds of output current values of said electromagnetic solenoids for vanishing the output speeds of said traveling hydrostatic stepless transmission and said steering hydrostatic stepless transmission when said brake operation tool reaches said neutral setting position are held under respective certain values.

16. The hydraulically driven traveling vehicle as set forth in claim 1, wherein an engine is allowed to start when said brake operation tool is operated at a stroke so as to reach a braking position and it is confirmed that said speed change operation tool is set at its neutral position.

17. A hydraulically driven traveling vehicle comprising: left and right drive axles;

a differential mechanism differentially connecting the drive axles to each other;

a traveling HST (hydrostatic stepless transmission) including a traveling HST pump with a swash plate and a traveling HST motor, wherein the traveling HST pump is adapted to be coupled to an engine and controls the traveling HST motor by regulating output of the traveling HST pump using the swash plate;

a steering HST including a steering HST pump with a swash plate and a steering HST motor, wherein the steering HST pump is adapted to be coupled to the engine and controls the steering HST motor by regulating output of the steering HST pump using the swash plate, wherein mutually opposite two-flow output rotations of said steering HST are separately transmitted to said respective drive axles while output rotation of said traveling HST is transmitted to an input section of said differential mechanism, thereby making said vehicle travel and turn;

a speed change operation tool manipulated by a driver so as to set each speed of said vehicle traveling forward and backward, wherein manipulated variable and direction of said speed change operation tool is converted into an electric signal;

a steering operation tool manipulated by a driver so as to set each turning radius of said vehicle turning left and right, wherein manipulated variable and direction of said steering operation tool is converted into an electric signal;

a pair of electromagnetic solenoids configured to control the respective swash plates under predetermined rules for regulate respective outputs of said traveling HST and said steering HST, wherein an output current value of each of said electromagnetic solenoids is controlled based on both the electric signals resulting from manipulation of said speed change operation tool and said steering operation tool so as to create an output rotary speed of each of said HSTs corresponding to said controlled output current value;

a brake for braking both said left and right drive axles disposed in a transmission system to both said drive axles; and a brake operation tool for acting said brake, wherein the output current values of said pair of electromagnetic solenoids are electrically controlled so as to vanish the output current values of said traveling HST and said steering HST, without changing positions of the speed change operation tool and the steering operation tool, when said brake operation tool is operated at a stroke so as to reach a prefixed neutral setting position.

18. The hydraulically driven traveling vehicle as set forth in claim 17, further comprising: a pair of hydraulic servomechanisms for manipulating said respective swash plates; and a pair of electromagnetic proportional valves for controlling said respective hydraulic servomechanisms, wherein said pair of electromagnetic solenoids are coupled to said respective electromagnetic proportional valves.

19. A hydraulically driven traveling vehicle with left and right drive axles, comprising:

a traveling HST, output of which is regulated by an electromagnetic solenoid;

a steering HST, output of which is regulated by an electromagnetic solenoid;

a speed change operation tool manipulated by a driver, which regulates both of the electromagnetic solenoids for the traveling HST and for the steering HST;

a steering operation tool manipulated by the driver, which regulates both of the electromagnetic solenoids for the traveling HST and for the steering HST;

a brake for braking both said left and right drive axles disposed in a transmission system to both said drive axles; and a brake operation tool for acting said brake, wherein output current values of said electromagnetic solenoids are electrically controlled so as to vanish output current values of said traveling HST and said steering HST, without changing positions of the speed change operation tool and the steering operation tool, when said brake operation tool is operated at a stroke so as to reach a prefixed neutral setting position, wherein both of the output of the traveling HST and the output of the steering HST are controlled by both of the speed change operation tool and the steering operation tool, whereby the output of the traveling HST and the output of the steering HST are correlated with each other.

* * * * *